(12) United States Patent
Tajima et al.

(10) Patent No.: US 9,768,580 B2
(45) Date of Patent: Sep. 19, 2017

(54) FREE-ELECTRON LASER DRIVEN BY FIBER LASER-BASED LASER PLASMA ACCELERATOR

(71) Applicant: ECOLE POLYTECHNIQUE, Palaiseau (FR)

(72) Inventors: Toshiki Tajima, Foothill Ranch, CA (US); Gerard Mourou, Paris (FR); Kazuhisa Nakajima, Ibaraki (JP)

(73) Assignee: ECOLE POLYTECHNIQUE, Palaiseau (FR)

( * ) Notice: Subject to any disclaimer, the term of this patent is extended or adjusted under 35 U.S.C. 154(b) by 0 days.

(21) Appl. No.: 14/917,622

(22) PCT Filed: Sep. 9, 2014

(86) PCT No.: PCT/EP2014/069222
§ 371 (c)(1),
(2) Date: Mar. 9, 2016

(87) PCT Pub. No.: WO2015/032995
PCT Pub. Date: Mar. 12, 2015

(65) Prior Publication Data
US 2016/0226212 A1    Aug. 4, 2016

(30) Foreign Application Priority Data
Sep. 9, 2013  (EP) ..................................... 13306235

(51) Int. Cl.
*H01S 3/09* (2006.01)
*H01S 3/067* (2006.01)
*H05G 2/00* (2006.01)

(52) U.S. Cl.
CPC ............ *H01S 3/0903* (2013.01); *H01S 3/067* (2013.01); *H05G 2/00* (2013.01)

(58) Field of Classification Search
None
See application file for complete search history.

(56) References Cited

U.S. PATENT DOCUMENTS

| 4,761,584 A | 8/1988 | Halbach |
| 5,019,863 A | 5/1991 | Quimby |
| 2012/0228526 A1 | 9/2012 | Vaschenko |

FOREIGN PATENT DOCUMENTS

WO    2013023053 A1    2/2013

OTHER PUBLICATIONS

International Search Report and Written Opinion dated Feb. 5, 2015 for corresponding International Application No. PCT/EP2014/069222, filed Sep. 9, 2014.

(Continued)

*Primary Examiner* — Armando Rodriguez
(74) *Attorney, Agent, or Firm* — David D. Brush; Westman, Champlin & Koehler, P.A.

(57) ABSTRACT

A Free Electron Laser source includes: a fiber-based laser having a plurality of amplifying fibers wherein an initial laser pulse is distributed and amplified, and element for grouping together the elementary pulses amplified in the fiber in order to form an a single amplified global laser pulse; a laser plasma accelerator wherein the global laser pulse generates relativistic electron beams, a beam focusing system transporting electron beams from the laser plasma accelerator, an undulator wherein relativistic electron beams generate an electromagnetic beam, and a beam separator system, wherein the electron beam and the electromagnetic beam are separated.

7 Claims, 14 Drawing Sheets

(56) References Cited

OTHER PUBLICATIONS

Wiggins S. M. et al.: "High quality electron beams from a laser wakefield accelerator", Conference on Lasers and Electro-Optics (CLEO) and Quantum Electronics and Laser Science Conference (QELS), 2010: May 16-21, 2010, San Jose, CA, USA, IEEE, Piscataway, NJ, USA, May 16, 2010 (May 16, 2010), pp. 1-2, XP031701440.
Hafz Nasr: "Laser-driven electron acceleration research at APRI and future application to compact light sources", Journal of the Korean Physical Society, vol. 56, No. 11, Jan. 15, 2010 (Jan. 15, 2010), p. 241, XP055101292.
Toshiki Tajima et al.: "ICAN: The Next Laser Powerhouse", Optics and Photonics News, May 1, 2013 (May 1, 2013), pp. 36-43, XP055101291.
G. Mourou et al.: "ICan and 100GeV's Ascent", EuroNNAc, May 2012 Meeting, CERN, May 1, 2012 (May 1, 2012), pp. 1-60, XP055101548.
Gerard Mourou: "Workshop IZEST 100GeV Ascent" May 2013 (May 2013), pp. 1-18, XP055101549.
C. McGuffey et al.: "Ionization Induced Trapping in a Laser Wakefield Accelerator", Physical Review Letters, vol. 104, No. 2, Jan. 1, 2010 (Jan. 1, 2010), XP055101503.
Pukhov A et al.: "The bubble regime of laser-plasma acceleration: monoenergetic electrons and the scalability; The bubble regime of laser-plasma acceleration", Plasma Physics and Controlled Fusion, IOP, Bristol, GB, vol. 46, No. 12B, Dec. 1, 2004 (Dec. 1, 2004), pp. 8179-8186, XP020049654.
H.-P. Schlenvoigt et al.: "A compact synchrotron radiation source driven by a laser-plasma wakefield accelerator", Nature Physics, vo 1 . 4, No. 2, Dec. 9, 2007 (Dec. 9, 2007), pp. 130-133, XP055101295.
H-P Schlenvoigt et al.: "Synchrotron Radiation From Laser-Accelerated Monoenergetic Electrons", IEEE Transactions on Plasma Science, IEEE Service Center, Piscataway, NJ, US, vol. 36, No. 4, Aug. 1, 2008 (Aug. 1, 2008), pp. 1773-1781, XP011232933.
P. Gasior: "Can ICAN can CERN into a can?: review study", Proceedings of SPIE, vol. 8903, Oct. 25, 2013 (Oct. 25, 2013), p. 89030N, XP055101289.
Vieira J F et al: "Three-Dimensional Structure of the Laser Wakefield Accelerator in the Blowout Regime", IEEE Transactions on Plasma Science, IEEE Service Center, Piscataway, NJ, US, vol. 36, No. 4, Aug. 1, 2008 (Aug. 1, 2008), pp. 1124-1125, XP011232963.
Yoshitama H et al.: "Physics of Gases, Plasmas, and Electric Discharges; Self-Injection and Acceleration of Monoenergetic Electron Beams from Laser Wakefield Accelerators in a Highly Relativistic Regimen", Chinese Physics Letters, Institute of Physics Publishing, Bristol, GB, vol. 25, No. 8, Aug. 1, 2008 (Aug. 1, 2008), pp. 2938-2941, XP020141951.
A. Pak et al.: "Injection and Trapping of Tunnel-Ionized Electrons into Laser-Produced Wakes", Physical Review Letters, vol. 104, No. 2, Jan. 1, 2010 (Jan. 1, 2010), XP055101496.
International Preliminary Report on Patentability and English translation of the Written Opinion dated Mar. 15, 2016, for corresponding International Application No. PCT/EP2014/069222, filed Sep. 9, 2014.
European Search Report and Written Opinion dated Feb. 26, 2014, for corresponding European Application No. EP 13306235, filed Sep. 9, 2013.
C. Xia, J. Liu, W. Wang, H. Lu, W. Cheng, A. Deng, W. Li, H. Zhang, X. Liang, Y. Leng, X. Lu, C. Wang, J. Wang, K. Nakajima, R. Li, and Z. Xu, "Effects of self-focusing on tunnel-ionization-induced injection in a laser wakefield accelerator," Phys. Plasmas 18, 113101 (2011).
J. S. Liu, C. Q. Xia, W. T. Wang, H. Y. Lu, C. Wang, A. H. Deng, W. T. Li, H. Zhang, X. Y. Liang, Y. X. Leng, X. M. Lu, C. Wang, J. Z. Wang, K. Nakajima, R. X. Li, and Z. Z. Xu, "All-Optical Cascaded Laser Wakefield Accelerator Using Ionization-Induced Injection," Phys. Rev. Lett. 107, 035001 (2011).
B. B. Pollock, C. E. Clayton, J. E. Ralph, F. Albert, A. Davidson, L. Divol, C. Filip, S. H. Glenzer, K. Herpoldt, W. Lu, K. A. Marsh, J. Meinecke, W. B. Mori, A. Pak, T. C. Rensink, J. S. Ross, J. Shaw, G. R. Tynan, C. Joshi, and D. H. Froula, "Demonstration of a Narrow Energy Spread, similar to 0.5 GeV Electron Beam from a Two-Stage Laser Wakefield Accelerator," Phys. Rev. Lett. 107, 045001 (2011).
M. Chen, E. Esarey, C. B. Schroeder, C. G. R. Geddes, and W. P. Leemans, "Theory of ionization-induced trapping in laser-plasma accelerators," Phys. Plasmas 19, 033101 (2012).
Kazuhisa Nakajima, Haiyang Lu, Xueyan Zhao, Baifei Shen, Ruxin Li and Zhizhan Xu, "100-GeV large scale laser plasma electron acceleration by a multi-PW laser" Chinese Optics Letters 11 (1), 013501-1~15 (2013).
J. K. Lim, P. Frigola, G. Travish, J. B. Rosenzweig, S. G. Anderson, W. J. Brown, J. S. Jacob, C. L. Robbins, and A. M. Tremaine, "Adjustable, short focal length permanent-magnet quadrupole based electron beam final focus system", Physical Review Special Topics—Accelerators and Beams 8, 072401-1~17 (2005).
P. Elleaume, J. Chavanne, Bart Faatz, "Design Considerations for a 1 angstrom SASE Undulator", Nuclear Instruments and Methods in Physics Research A 455, 503-523 (2000).
T. Eichner, F. Grüner, S. Becker, M. Fuchs, D. Habs, R. Weingartner, U. Schramm, H. Backe, P. Kunz, and W. Lauth, "Miniature magnetic devices for laser-based, table-top free-electron lasers", Physical Review Special Topics Accelerators and Beams 10, 082401 (2007).
C. Pagani, E.L. Saldin, E.A. Schneidmiller, M.V. Yurkov, "Design considerations of 10 kW-scale extreme ultraviolet SASE FEL for lithography", Nuclear Instruments and Methods in Physics Research A 463, 9-25 (2001).

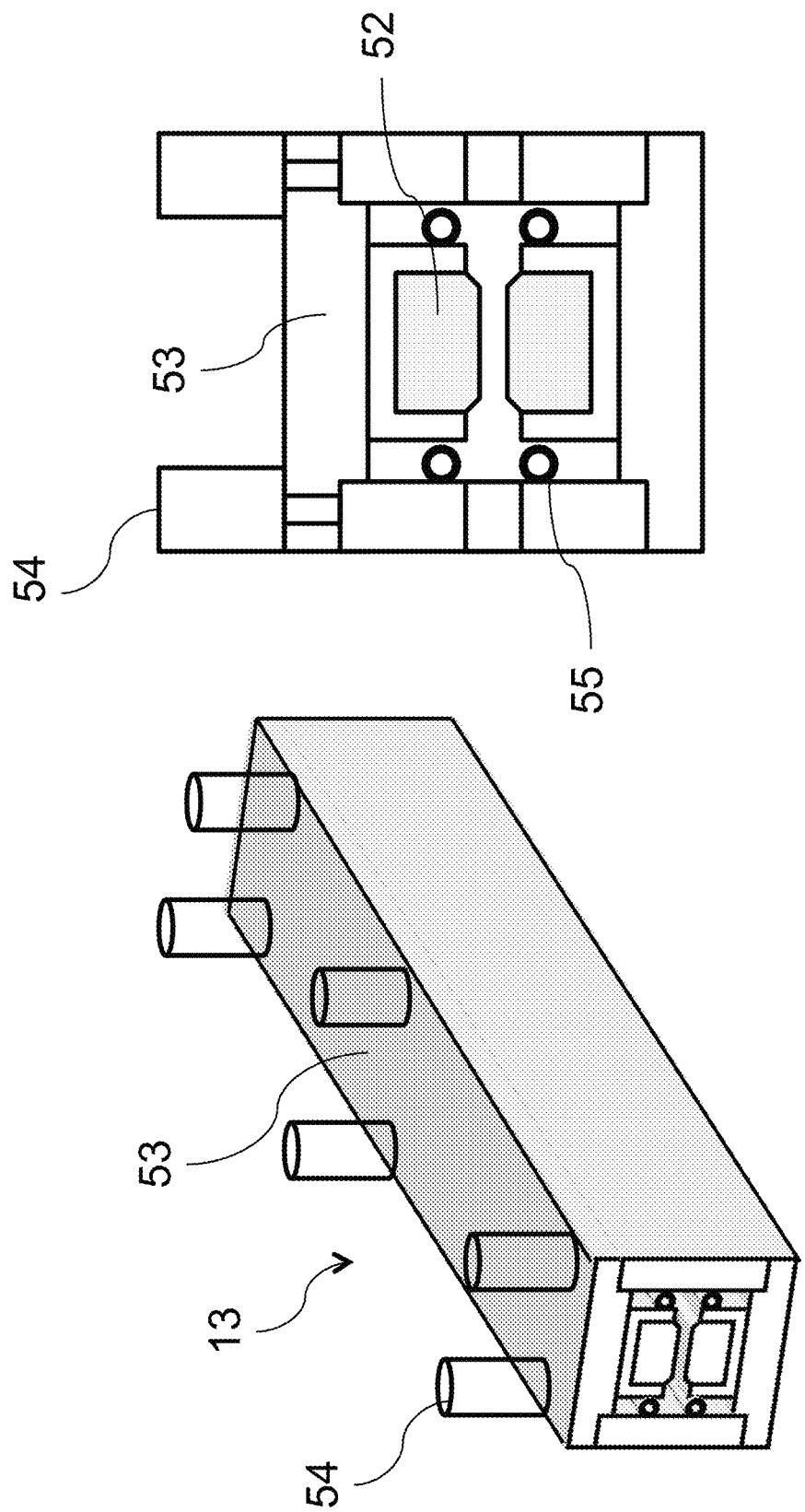

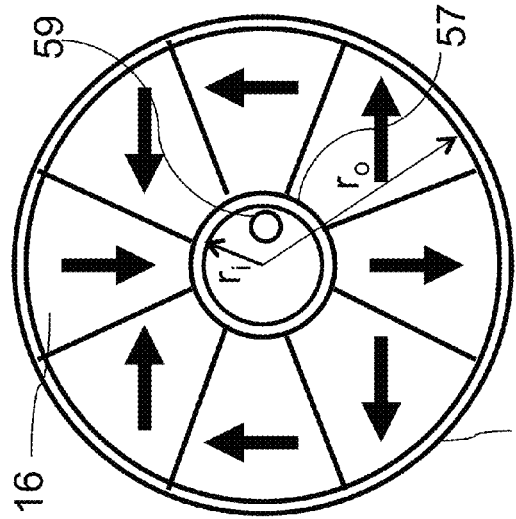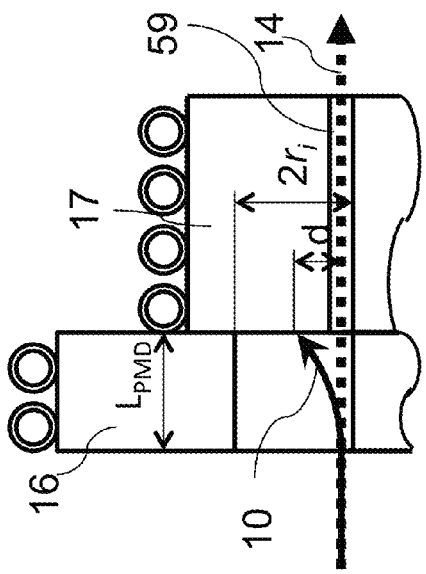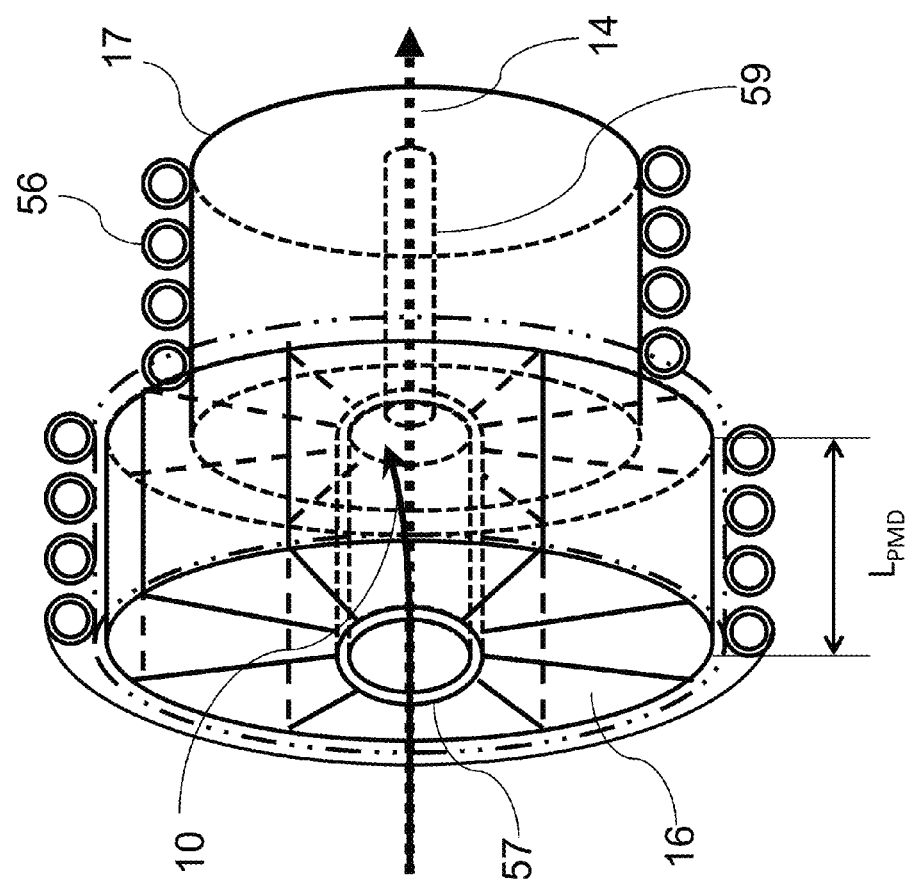
Fig. 11A
Fig. 11B
Fig. 11C

FREE-ELECTRON LASER DRIVEN BY FIBER LASER-BASED LASER PLASMA ACCELERATOR

1. CROSS-REFERENCE TO RELATED APPLICATIONS

This Application is a Section 371 National Stage Application of International Application No. PCT/EP2014/069222, filed Sept. 9, 2014, the content of which is incorporated herein by reference in its entirety, and published as WO 2015/032995 on Mar. 12, 2015, in English.

2. FIELD OF THE INVENTION

The invention relates to a new embodiment of a Free-Electron Laser ("FEL").

The invention also relates to the use of such a Free-Electron Laser as an Extreme UltraViolet ("EUV") light sources for Extreme UltraViolet lithography.

3. BACKGROUND OF THE INVENTION

Background of Free-Electron Lasers ("FEL")

A Free-Electron laser (FEL), is a type of laser that use a relativistic electron beam that moves freely through a magnetic structure, in order to create a beam consisting of coherent electromagnetic radiation that can reach high power. In this type of laser, the free electron beam is the lasing medium. The free-electron laser has the widest frequency range of any laser type, and can be widely tunable, currently ranging in wavelength from microwaves, through terahertz radiation and infrared, to the visible spectrum, ultraviolet, and X-ray.

To create a Free-Electron Laser, a beam of electrons is accelerated to almost the speed of light. The beam passes through the Free-Electron Laser oscillator, a periodic transverse magnetic field produced by an arrangement of magnets with alternating poles within an optical cavity along the beam path. This array of magnets is commonly configured as an undulator, because it forces the electrons in the beam to follow a sinusoidal path. The acceleration of the electrons along this path results in the release of photons (synchrotron radiation). Since the electron motion is in phase with the field of the light already emitted, the fields add together coherently. The wavelength of the light emitted can be readily tuned by adjusting the energy of the electron beam or the magnetic field strength of the undulators.

A free-electron laser requires the use of an electron accelerator, which is very voluminous, requires a high voltage supply, has a very low repetition rate and is expensive.

Background of Extreme Ultraviolet ("EUV") Light Sources

Extreme UltraViolet ("EUV") with wavelengths below about 50 nm and more specifically around and below 13.5 nm can be used in microlithography processes to enhance the resolution of optical systems that are limited by the diffraction limit of light accompanying miniaturization of semiconductor integrated circuits. This technology called as extreme ultraviolet lithography (EUVL) is capable of providing resolution below 30 nm that had been impossible with conventional optical lithography that utilizes deep ultraviolet (DUV) light sources with wavelengths of 248 nm or 193 nm.

The current technologies for generating high power Extreme UltraViolet radiation at 13.5 nm, referred to as laser produced plasma (LPP), employs the deposition of laser energy into a source element, such as xenon (Xe), tin (Sn) or lithium (Li), creating ionized gas microplasma at electron temperatures of several tens of electron volts. As these highly excited ions decay, energetic radiation is emitted in all directions of $4\pi$ radians.

One particular laser produced plasma (LPP) technique involves irradiating molten tin droplets with one or more pre-pulse(s) followed by a main pulse. In this regard, $CO_2$ lasers at the wavelength of 10.6 µm provide certain advantages as a drive laser producing main pulses in the laser produced plasma (LPP) process thanks to the ability to produce a relatively high conversion efficiency, i.e., the ratio of output Extreme UltraViolet in-band to drive laser input power.

For Extreme UltraViolet lithography, the 13.5 nm radiation is collected by a mirror (either grazing incidence or normal incidence) and focused to an intermediate focal point where it is relayed to the scanner optics and, ultimately, the wafer.

For example, one apparatus currently being developed with the goal of producing about 100 W at the intermediate location contemplates the use of a pulsed, focused 10-12 kW $CO_2$ drive laser which is synchronized with a droplet generator to sequentially irradiate about 40 k-100 k tin droplets per second. For this purpose, there is a need to produce a stable stream of droplets at a relatively high repetition rate (e.g. 40-100 kHz or more) and deliver the droplets to an irradiation site with high accuracy and good repeatability in terms of timing and position, i.e., with very small jitter, over a relatively long period of time.

The current laser produced plasma (LPP) radiation sources have a serious obstacle on the way to a high volume manufacturing (HVM) source such as small efficiency of the radiation source, a limited set of discrete wavelengths and the mitigation of the plasma debris required for the protection of Extreme UltraViolet optics.

Background of Free Electron Laser Used as Extreme UltraViolet Light Sources

Free-Electron Laser based radiation sources have evident advantages in wavelength tunability, high efficiency and high output power, compared to current laser produced plasma (LPP) radiation sources. The problem of debris mitigation does not exist at all. There is no need to use a multilayer coated reflective collector, of which reflectivity is limited to about 70%, since the radiation is produced in the diffraction limited volume. Hence, there is no problem with the transport of radiation to the exposure system. Harnessing such advantages of Free-Electron Laser based Extreme UltraViolet radiation sources liberated from the debris mitigation and a mechanical targeting system such as a droplet generator, the Free-Electron Laser based Extreme UltraViolet radiation source may have an average output power of 0.5 kW at a repetition rate of at least 250 kHz for meeting the requirements of the light source at 13.5 nm for the next generation lithography.

A proposed Free-Electron Laser based Free-Electron Laser producing a kW-level average output power of Extreme UltraViolet radiation utilizes high-energy electron beams of the order of 1 GeV generated from a radiofrequency (RF)-based linear accelerator that comprises a high-brightness electron injector typically composed of a photocathode RF gun or thermionic high-voltage DC gun and several buncher cavities for producing electron bunches, a several-stage magnetic bunch compressor system comprising a sequence of RF structure and bending magnets for compressing a bunch length and increasing a peak beam current and a main linac composed of a series of room-temperature or superconducting RF cavities with the accelerating gradient of the order of 10 MV/m and a beam transport system including beam focusing and defocusing electro-quadrupole magnets, lastly followed by undulators with a total length of 30 m, providing alternating magnetic fields to force electrons on a sinusoidal trajectory so that all electrons in a electron bunch emit coherently due to the microbunching process, called as self-amplified spontaneous emission (SASE) Free-Electron Laser. The overall size of a RF linac-driven Free-Electron Laser-based Extreme UltraViolet light source may require a 250 m long facility for a linac-based light source or a 120 m long, 60 m wide area for a recirculator-based light source. The costs for construction and operation of such facility may turn out incredibly so large as to prevent the Free-Electron Laser-based Extreme UltraViolet light sources from industrial realization of the next generation lithography technology.

4. SUMMARY OF THE INVENTION

An exemplary aspect of the present disclosure relates to a Free Electron Laser source generating an electromagnetic beam presenting a wavelength, called Free Electron Laser wavelength, belonging to the range from 5 nm to 15 nm, said Free Electron Laser comprising:
  a fiber-based laser, comprising a plurality of amplifying fibres wherein an initial laser pulse is distributed and amplified, and means for grouping together the elementary pulses amplified in the said fibre in order to form an a single amplified global laser pulse, and comprising a stretching device able to stretch out in time said initial laser pulse, according to the chirped pulse amplification technique and a grating pulse compressor able to compress in time the said single amplified global laser pulse, according to the chirped pulse amplification technique,
  said fiber-laser being tuned using at least one parameter, called fiber-based laser parameter, said at least one fiber-based laser parameter being obtained as a function of said Free Electron Laser wavelength;
  a laser plasma accelerator wherein, in a bubble regime of said plasma accelerator said global laser pulse generates relativistic electron beams, said laser plasma accelerator being tuned using at least one parameter, called laser plasma accelerator parameter, said at least one laser plasma accelerator parameter being obtained as a function of said Free Electron Laser wavelength;
  a beam focusing system transporting electron beams from the laser plasma accelerator to an undulator;
  said undulator wherein relativistic electron beams generate an electromagnetic beam, a peak magnetic field and a period of said undulator being previously set,
  said undulator being tuned using at least one parameter, called undulator parameter, said at least one undulator parameter being obtained as a function of said Free Electron Laser wavelength;
  a beam separator system, wherein the said electron beam and the said electromagnetic beam are separated.

Thanks to the particular combination of the elements constituting said Free Electron Laser, the Free Electron Laser source, or Free Electron Laser, according to the invention is more compact and efficient, cheaper and has a higher repetition rate and a higher average power as the prior art Free Electron Laser sources.

Such a result can only be obtained because of the particular tuning technique implemented according to the present invention. Indeed, as detailed in the following section 6.5 the tuning of the components of said Free Electron Laser is optimised since at least one parameter of the fiber-based laser (e.g. the average fiber laser power, the required pulse duration, the match spot radius, the peak power, laser energy pulse, etc.), at least one parameter of the laser plasma accelerator (e.g. the electron beam energy, the plasma density, the accelerator length, etc.), and at least one parameter of the undulator (e.g. the Pierce Parameter, the saturation length, the total number of periods, etc.) are all tuned as a function of the Free Electron Laser wavelength, when the peak magnetic field and the period of the undulator have been previously set.

Thus, all the essential components of the Free Electron Laser are tuned in synergy as a function of a same parameter, which corresponds to the Free Electron Laser wavelength. Such a relation between all the major parameters of the FEL is not trivial and requires an inventive step.

Such a synergy between the components constituting said Free Electron Laser is neither disclose nor suggest by the prior art, which does not give any concrete solution for designing and implementing a Free Electron Laser whose wavelength belongs to the range from 5 nm to 15 nm.

Indeed, considering the disclosure of Wiggins S. M. and al. ("*High Quality electron beams from a laser wakefield accelerator*", Conference on Lasers and Electro-Optics (CLEO) and Quantum Electronics and Laser science Conference (QELS), 2010 pages 1-2 XP031701440), only a classical Laser-Plasma Accelerators towards X-rays combined with a classical undulator are disclosed. Such elements are designed to create an ALPHA-XLWFA line, which could be used for a FEL operation. It has to be noted that such a document discloses only beam transport simulations to illustrate how an FEL laser operating in the VUV using current 100-150 Mev electron Beams can be implemented, and disclose only that a compact x-ray FEL should be possible by scaling the LWFA to the gigaelectronvolt range without disclosing any solution to achieve it. Thus, it can be noticed that no full and effective implementation of a FEL with a wavelength range from 5 nm to 15 nm is disclosed by Wiggins S. M, which underlines that, at the time of the publication of this document, proposing such an effective implementation is tricky and not trivial.

In addition, Wiggins S. M. does not disclose that at least one parameter of the laser plasma accelerator, and at least one parameter of the undulator, are obtained as a function of said Free Electron Laser wavelength.

Even if the one skilled in the art would replace the laser disclosed by Wiggins S. M. by the one disclosed by Tajima T ("*ICAN: The next Laser Powerhouse*", Optics and Photonics news, & May 2013, pages 36-43 XP0055101291), he would not obtained a FEL according to the present invention.

Indeed, the laser disclosed by Tajima, which uses optical fibers (as the one according to the present invention), is not designed such that its major parameters depend all on the Free Electron Laser wavelength. Indeed, no FEL is disclosed by Tajima, who discloses only a use of such fiber-based laser to treat nuclear waste.

Thus the combination of the Alpha-XLWFA beam line of Wiggins S. M. on the one hand with the laser disclosed by Tajima on the other hand would not lead to an effective and usable FEL with a wavelength ranging from 5 nm to 15 nm, since the laser plasma accelerator and the undulator of Wiggins are tuned for delivering 70-150 Mev electron beams, independently from the laser disclosed by Tajima dedicated to treat nuclear waste.

Such a combination can not simply work since a laser able to deliver a gigaelectronvolt is not adapted to be combined with laser plasma accelerator and the undulator of Wiggins tuned for delivering 70-150 Mev. Indeed, combining these elements is a tricky issue and no solution about a workable combination is disclosed or suggested.

Thus, such combination of prior art documents can not lead to achieve a concrete and efficient implementation of a FEL with a wavelength ranging from 5 nm to 15 nm.

Thanks to the particular tuning in synergy of all the elements constituting the FEL according to the invention, concrete compact and efficient FELs are designed (see Table 1 and Table 2 in the following), which make them usable for industrial lithography. Thus, a great achievement is obtained regarding the prior art, which was aiming to obtain one day such an efficient FEL.

Furthermore, using this chirped pulse amplification technique (CPA), the fiber-based laser can emit pulses of very high energy.

Preferably, said laser plasma accelerator comprises:
a first gas cell filled with mixed gas, and
a second gas cell filled with pure helium gas.
a gas feeding system.

Such a laser plasma accelerator is very efficient, with a very high repetition rate.

Preferably, said laser plasma accelerator comprise means for modifying the length of the said second gas cell.

The wavelength of the electromagnetic beam emitted by the Free Electron Laser source can then be tuned.

Preferably said beam separator system comprises a dipole magnet for bending electron beams and a beam dump.

It has to be noticed that as detailed later the permanent magnet dipole length required for deflecting depends on the electron beam energy $E_b$, which depends itself on the FEL wavelength as detailed is section 6.5.

Advantageously, said electromagnetic beam is a Extreme UltraViolet beam.

The Free Electron Laser according to this embodiment can provide a Extreme UltraViolet source usable for lithography application. Such a Extreme UltraViolet source is more compact and efficient, cheaper and having a higher repetition rate and a higher average power as the prior art Extreme UltraViolet sources.

According to a preferred embodiment, said Extreme UltraViolet beam wavelength is 13.5 nm.

According to an other possible embodiment, said Extreme UltraViolet beam wavelength is 6.7 nm.

5. BRIEF DESCRIPTION OF THE DRAWINGS

The invention will become more fully understood from the following description of preferred but non-limiting embodiments thereof, described in connection with accompanying drawings, wherein:

FIGS. 10A and 10B show a schematic assembly of the undulator used in the Free Electron Laser of FIG. 1.

FIGS. 11A, 11B and 11C shows a monolithic beam dump system comprising a permanent magnet dipole separating electron beams from Extreme UltraViolet radiation and a electron beam dump.

Figure 1:
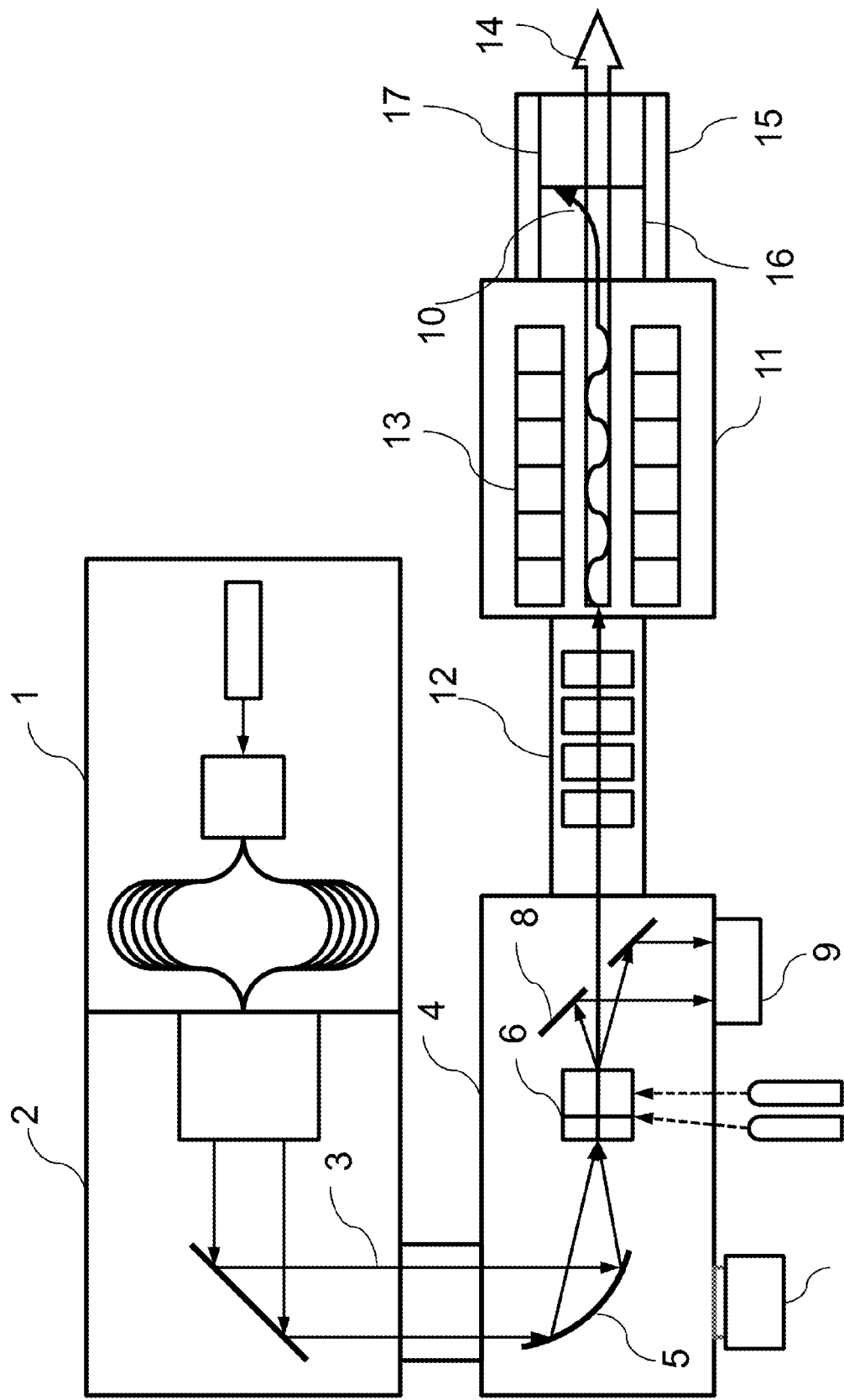
FIG. 1 shows a schematic diagram of a Free Electron Laser according to an embodiment of the invention, usable as an Extreme UltraViolet light source.
Figure 13:
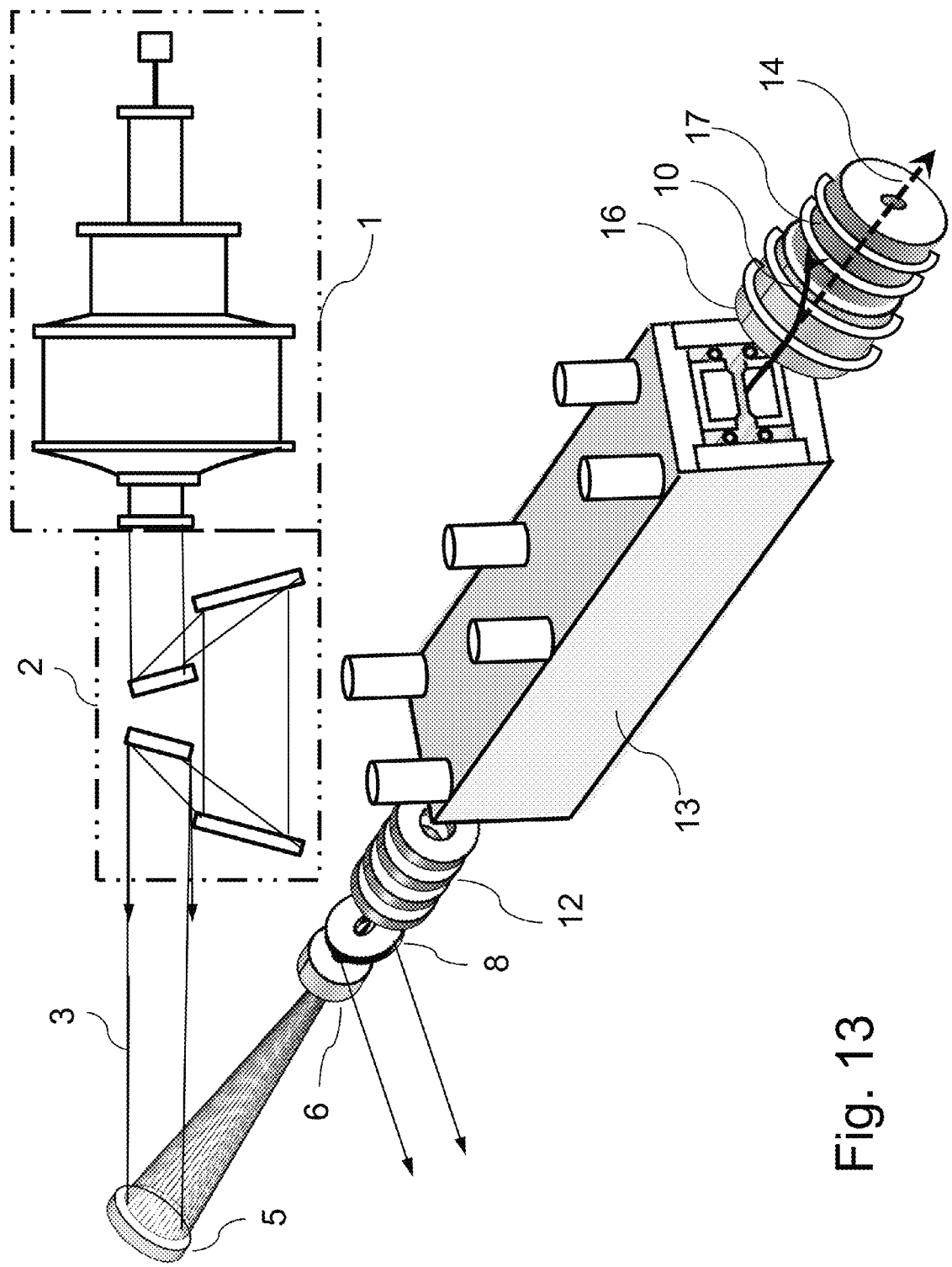
Figure 14:
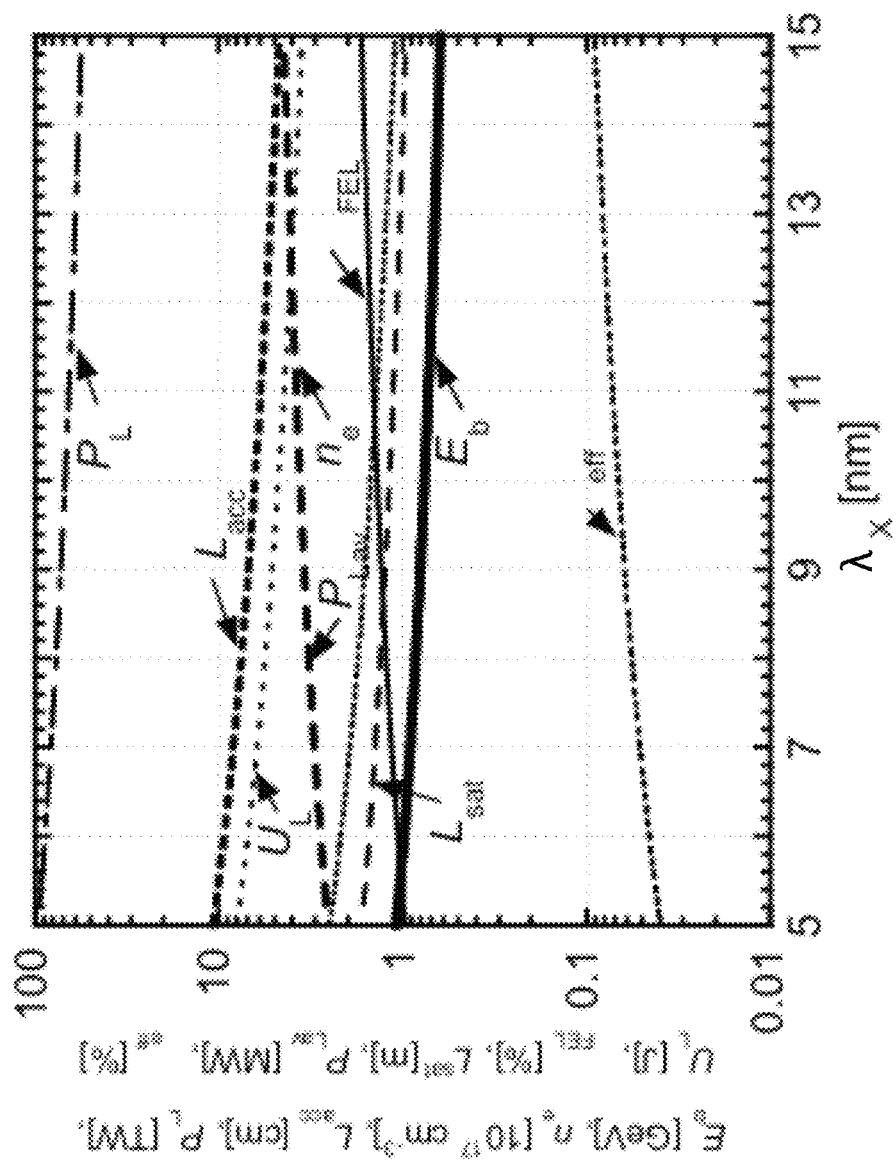

FIG. 13 illustrates schematically the Extreme UltraViolet light source of FIG. 1, based on a compact Free-Electron Laser driven by a fiber laser-based plasma accelerator according to aspects of an embodiment of the present invention, FIG. 14 illustrates how the parameters of each component constituting the Free-Electron Laser of FIG. 1, are obtained as a function of the Free-Electron Laser wavelength according to aspects of an embodiment of the present invention

6. DETAILED DESCRIPTION OF THE PREFERRED EMBODIMENTS OF THE INVENTION

6.1 General Description of a Free-Electron Laser According to an Embodiment of the Invention With initial reference to FIG. 1, there is shown a schematic diagram of a proposed Free-Electron Laser according to one aspect of an embodiment. As shown in FIG. 1, and described in further detailed below, the proposed Free-Electron Laser may include a drive laser system 1 for generating high energy laser pulses at a high repetition rate of the order of 1 MHz and delivering intense laser pulses 3 compressed through a pulse compressor chamber 2 into a laser plasma accelerator chamber 4. Such a laser-driven Free-Electron Laser can be used as an Extreme UltraViolet light source.

Fibre-Type Laser

Figure 2:
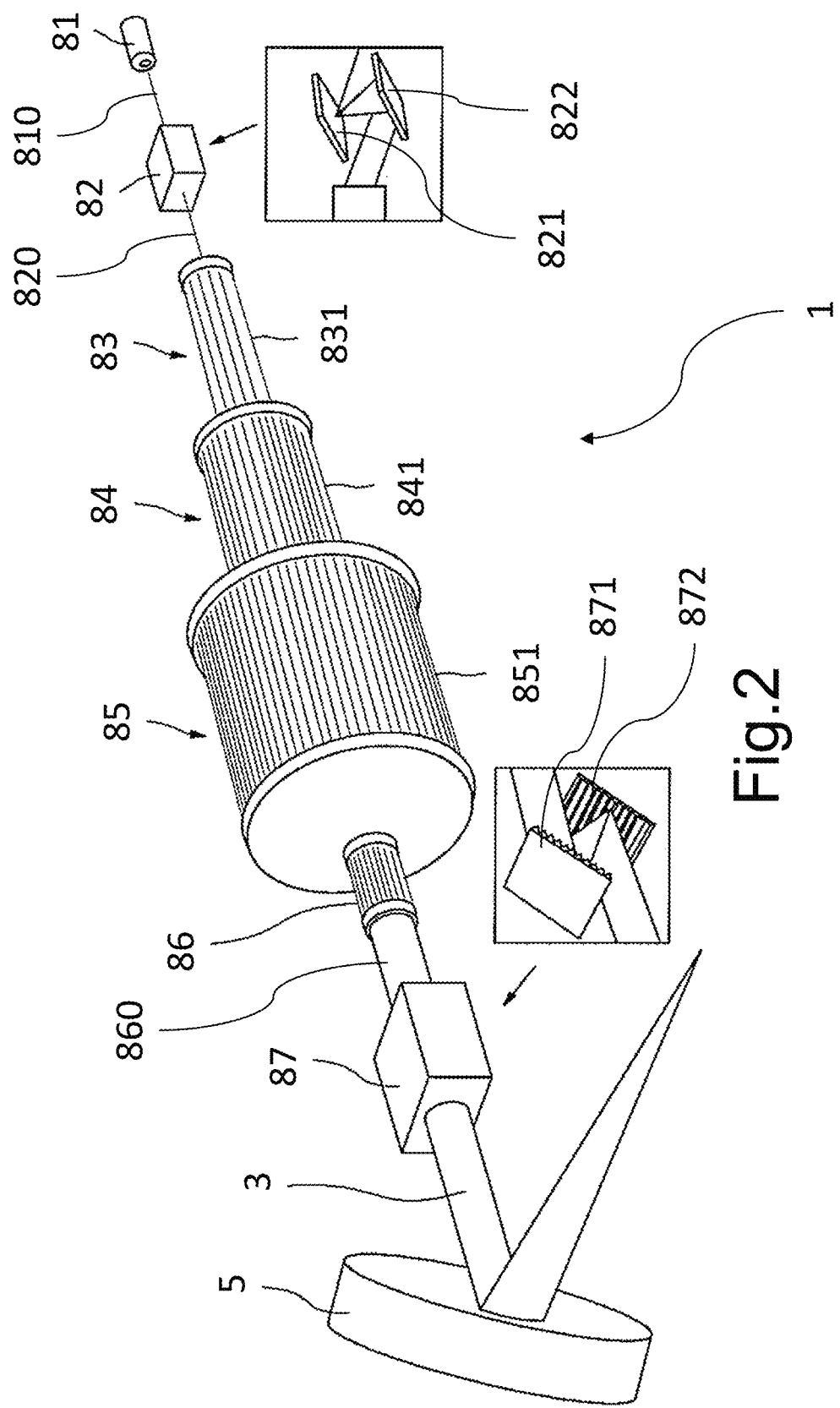
FIG. 2 illustrates a schematic diagram of a coherent combining fiber-based drive laser used in the Free Electron Laser of FIG. 1.

FIG. 2 shows an item of drive laser system 1 for producing high-energy laser pulses.

In this drive laser system 1, a low-energy laser pulse 810 is produced by an oscillator 81. This pulse 810 is then stretched out in time, according to the chirped pulse amplification (CPA) technique, by a stretching device 82, comprising a pair of diffraction gratings 821 and 822, having the effect of offsetting in time the various spectral components of the original low-energy pulse 810. The stretched pulse 820 then has a lower peak power and a longer duration of the pulse 810.

This laser pulse 820 is then distributed in a plurality of amplifying fibres 831 forming a first amplifying stage 83 of the fibre-type laser amplifier. The various fibres are separated from one another so as to make it possible to cool them effectively. Each of the amplifying fibres 831 comprises a core made from doped material, and is optically pumped, so as to optically amplify the laser pulse flowing in the fibre. The pulse passing through each of these amplifying fibres 831 is then amplified, and is then itself distributed in a plurality of amplifying fibres 841 forming the second amplification stage 84 of the fibre-type laser amplifier. Once again, the pulse passing through each of these amplifying fibres 841 is amplified and is then itself distributed in a plurality of amplifying fibres 851 forming the third amplification stage 85 of the fibre-type laser amplifier. Thus, in each amplification stage, the pulse is amplified in a plurality of fibres independent of one another and then divided so that pulses of lower power are transmitted to each of the higher-level amplification fibres.

The third and last amplification stage 85 then comprises a very large number of amplifying fibres, for example around $10^6$. Each of the amplifying fibres of this third stage is extended by a transmission fibre having a very low loss level. The transmission fibres are collected together in a cluster 86 so that the pulses emerging from each of the ends of these transmission fibres are emitted in parallel and juxtaposed. These pulses then form a single amplified global pulse 860.

This amplified global pulse 860 is compressed timewise by a compressor 87, located in the pulse compressor chamber 2. This compressor 87 comprises a pair of diffraction gratings 871 and 872, grouping together in time the various spectral components of the pulse. The pulse 3 emerging from this temporal compressor 17 then has a very high energy and very short duration.

Two Stages Gas Cell Plasma Accelerator with Ionization-Induced Injection

As shown in FIG. 1, the ultrashort intense laser pulse 3 is focused by an off-axis parabolic mirror 5 on the entrance of a two-stage gas cell 6, of which the first cell referred to an injector is filled with a mixed gas, e.g., helium gas mixed with nitrogen, and the second cell referred to as an accelerator is filled with a pure gas, e.g., hydrogen or helium. The gases are fed through a gas flow control system 7 to the two-stage gas cell separately at the different pressures.

As described below, in the injector of the gas cell 6, the said laser pulse 3 excites large-amplitude plasma wakefields, of which an accelerating electric field can trap plasma electrons exclusively out of the inner shell electrons and accelerate them owing to ionization-induced injection. A pre-accelerated electron beam 10 from the injector is further accelerated to the relativistic energy of the order of 1 GeV in the accelerator stage of the gas cell 6, where the laser pulse generates plasma wakefields of the order of 1 GV/cm. A transmitted laser light is directed through a mirror with a beam hole 8 to a recovery box 9 that includes diagnostics and absorbers of the transmitted laser pulses.

This plasma accelerator is particularly advantageous when it is combined with a fiber-based laser, a beam focusing system, an undulator and a beam separator system according to the invention. However, such a laser plasma accelerator comprising a first gas cell filled with mixed gas, and a second gas cell filled with pure helium gas can also be combined with an other type of laser, for producing relativistic electron beams.

Beam Focusing System, Undulator and Separation Chamber

The output electron beam 10 from the laser plasma accelerator chamber 4 is transported into an undulator 13 through a beam focusing system 12, installed in a radiation chamber 11. As described below, the electron beam 10 focused by quadrupole magnetic field of the beam focusing system 12 generates the resonantly amplified Extreme UltraViolet radiation 14 due to self-amplified spontaneous emission (SASE) mechanism when passing through the alternating dipole magnetic fields of the undulator 13 that force the electron bunch on a sinusoidal trajectory.

After passing through the undulator 13, the electron bunch is decelerated so strongly that it becomes non-resonant and could not contribute to the amplification of the Extreme UltraViolet radiation, i.e., the onset of saturation. The decelerated electron beam 10 is separated from the Extreme UltraViolet radiation 14 in the dipole magnetic field of the deflection magnet 16 and dumped to a beam dump 17, while the saturated Extreme UltraViolet radiation 14 is extracted from a beam separation chamber 15 and directed to a Extreme UltraViolet lithography scanner/stepper.

6.2. Detailed Description of the Laser Plasma Accelerator Chamber

Two-Stage Gas Cell

Figure 3:
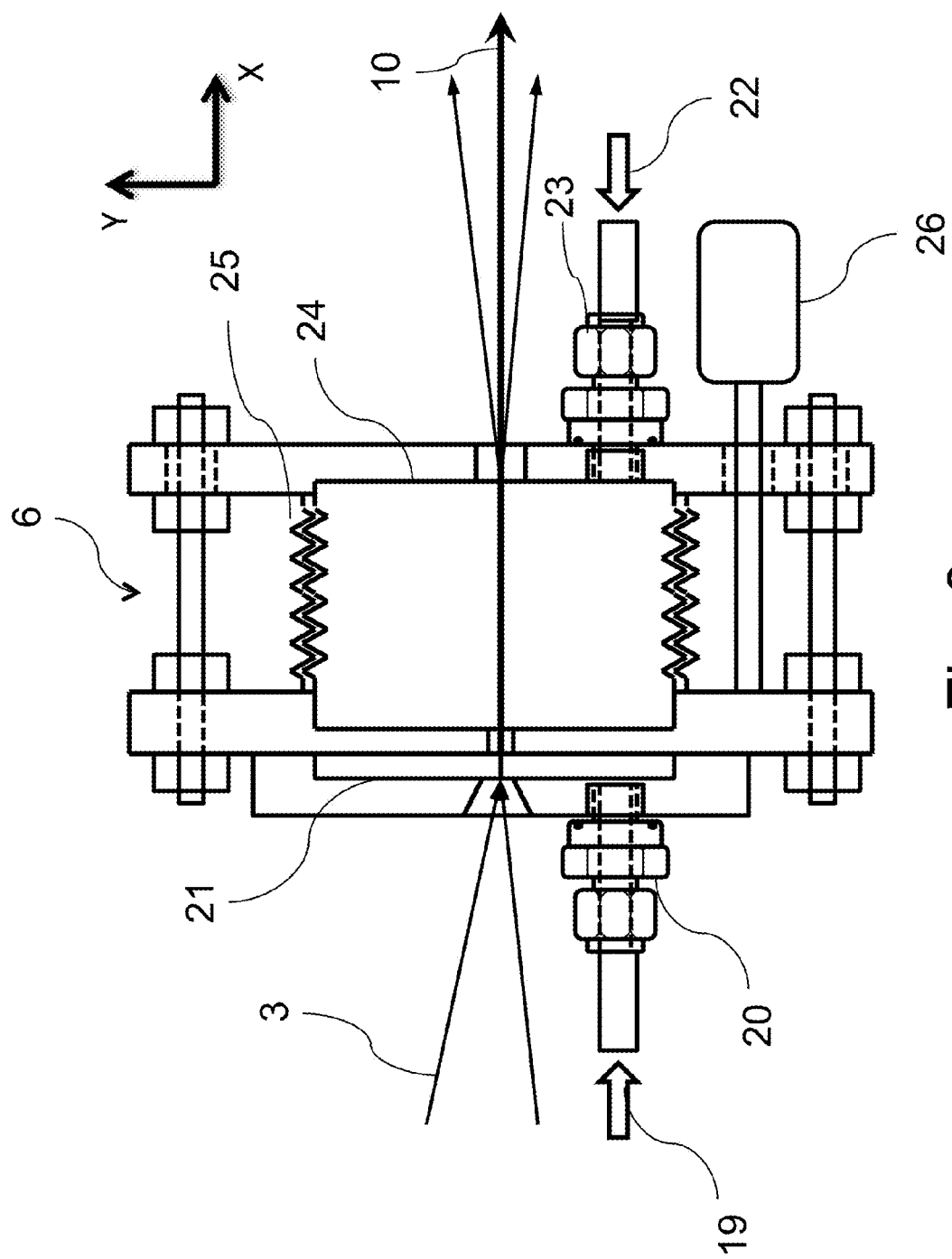
FIG. 3 shows the two-stage gas cell plasma accelerator of the Free Electron Laser of FIG. 1.
Figure 4:
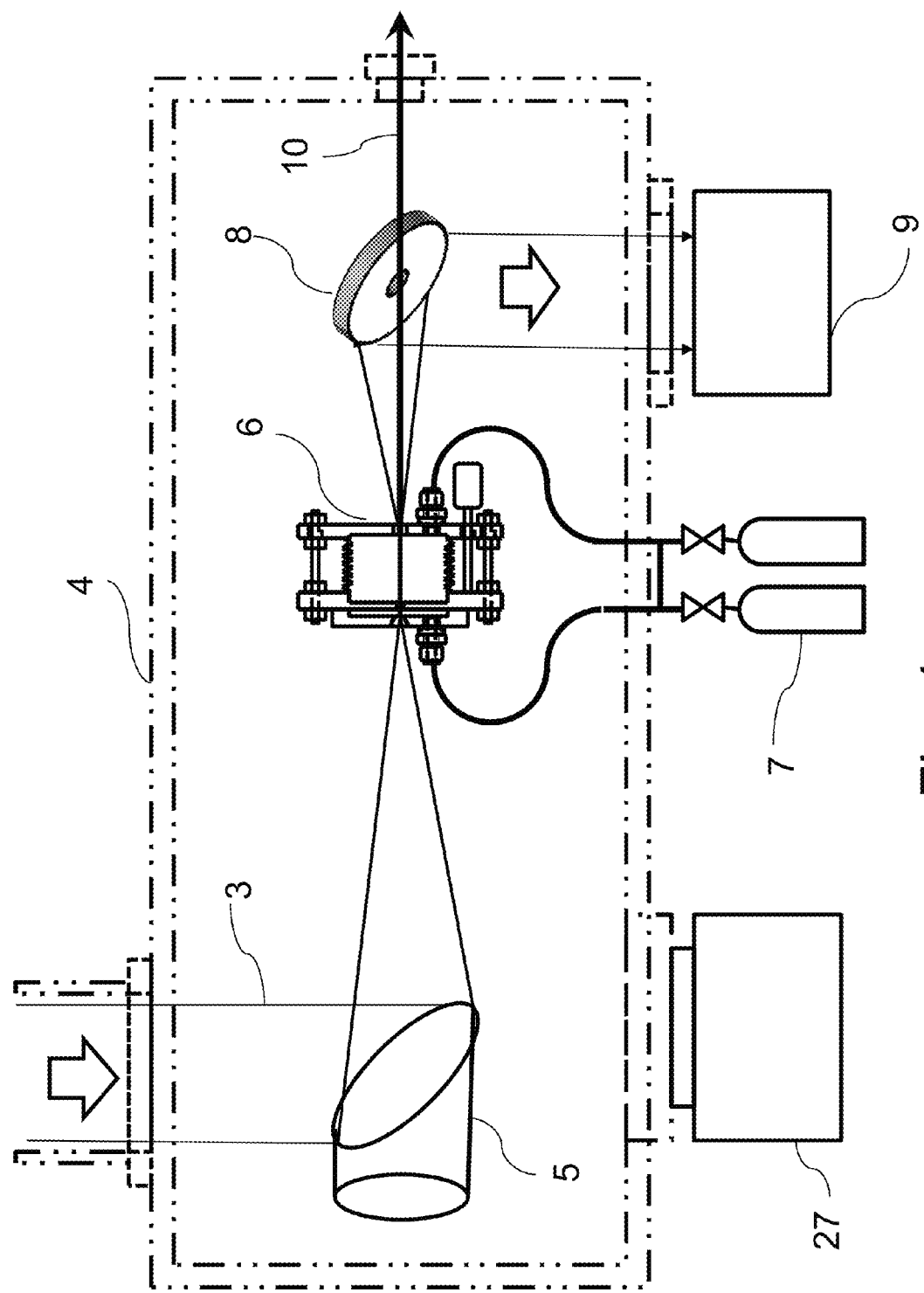
FIG. 4 shows the laser plasma electron accelerator system of the Free Electron Laser of FIG. 1, comprising the gas cell plasma accelerator of FIG. 3.

FIG. 3 shows schematically a two-stage gas cell 6 comprising an injector stage 21 and an accelerator stage 24 for efficient electron trapping and acceleration in laser wakefields. As shown in FIG. 4, the two-stage gas cell is set up in a laser plasma accelerator chamber 4 and a compressed laser pulse 3 from the pulse compressor chamber 2 is focused on the entrance of the injector gas cell by an off-axis parabolic mirror 5 with a F-number, e.g., 20.

The injector cell 21 is filled with a mixed gas, e.g., 98% He and 2% $N_2$, fed through a gas feedthrough 20 from the gas flow control system 7. The accelerator cell 24 is filled with a pure gas, e.g. $H_2$ or He, fed through a gas feedthrough 24 from the gas flow control system 7. A length of the accelerator stage is variably adjusted with a bellows structure 25 driven by a motorized actuator 26. Such an adjustment can permit to reuse easily the accelerator stage, using said motorized actuator 26, for different Free-Electron laser wavelengths ranging from 5 nm to 15 nm. The laser plasma accelerator chamber 4 is pump out by a vacuum pump system 27 to keep an inside pressure of $10^{-3}$-$10^{-4}$ Pa.

Description of the Physical Process

Figure 5:
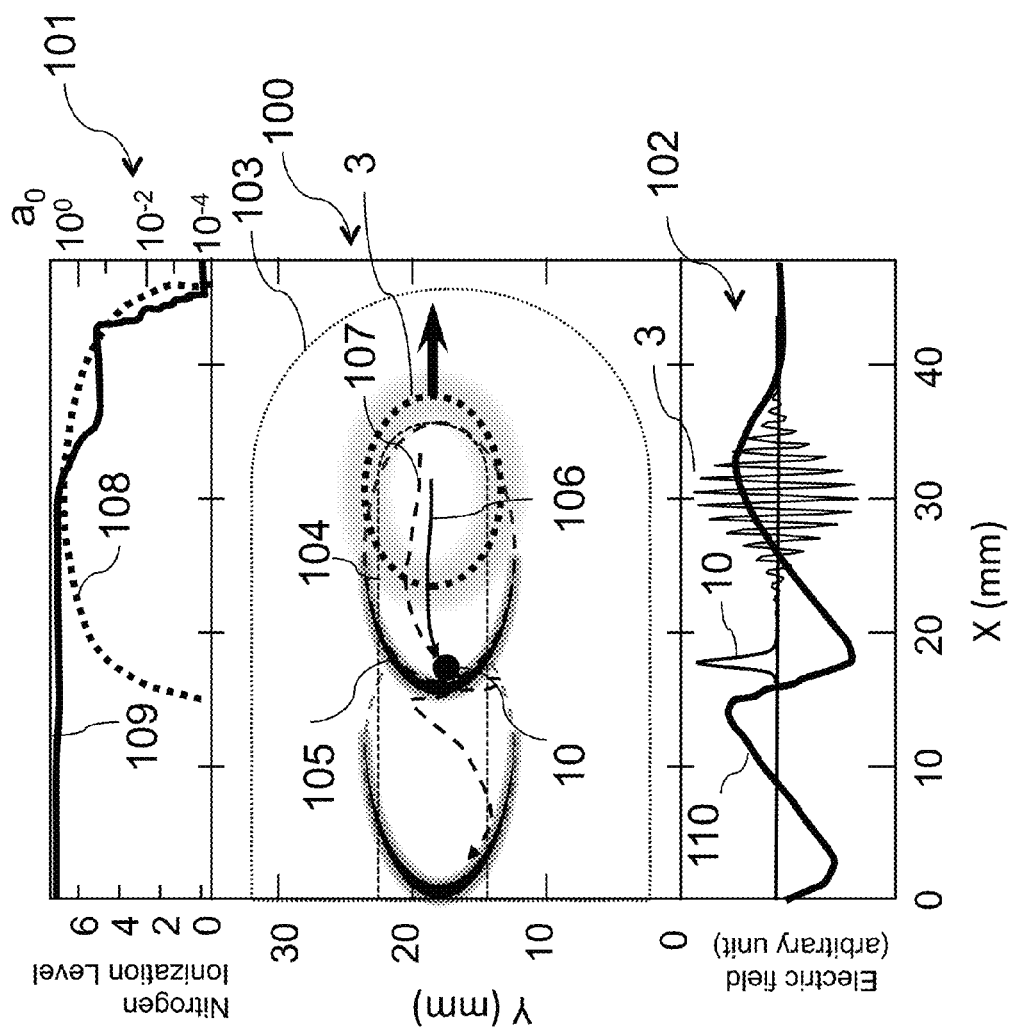
FIG. 5 illustrates schematically electron acceleration mechanism due to laser wakefield.

FIG. 5 illustrates schematically a physical process 100 for the wakefield excitation and electron trapping and acceleration in wakefields, which are generated when an intense laser pulse propagates a neutral mixed gas in the injector 21. In FIG. 5, the evolution of plasma electron density is shown in the upper plot 101 and the excited longitudinal wakefield is shown in the lower plot 102.

As shown in the central part 100 of FIG. 5, He and the outer shell electrons up to $N^{5+}$ are fully ionized in the leading front of the laser pulse with intensity $1.5 \times 10^{16}$ W/cm$^2$ to produce plasma electrons in the outer region of the laser pulse, of which the boundary is indicated by a thin dotted line 103. Since two inner shell (K-shell) electrons of $N^{6+}$ and $N^{7+}$ are ionized at the laser intensity higher than $1 \times 10^{19}$ W/cm$^2$, the inner shell electrons are produced only near the peak intensity of the laser pulse 3, of which the intensity profile is indicated by a thick dotted line 108 for the normalized laser field $a_0 \approx 0.855 \times 10^{-9} I^{1/2}$ [W/cm$^2$]$\lambda_L$ [μm]=2 where I [W/cm$^2$] is the intensity and $\lambda_L$ [μm] is the laser wavelength. In the upper plot 101, a thick solid curve 109 indicates the evolution of ionization level of nitrogen (the electron number of ionized nitrogen atom) along the propagation axis. A boundary of the plasma region containing the inner shell electrons from ionized N$^{6+}$ and N$^{7+}$ is indicated by a thin dashed line 104.

Plasma electrons contained in the boundary 103 are blown out by radiation pressure (ponderomotive force) of the laser pulse 3 with the relativistic intensity $a_0$ 1 and form a narrow dense electron sheath surrounding a spherical ion column behind the laser pulse, often referred to as a bubble 105. Such charge separation generates a strong longitudinal electric field 110 of the order of 100 GV/m at a plasma electron density of $10^{18}$ cm$^{-3}$, which is three orders of magnitude higher than an accelerating field of conventional RF accelerators. In the bubble 105, an electron undergoes a strong focusing force simultaneously. Hence, once electrons 10 are trapped into a bubble, they are efficiently accelerated up to high energy of the order of 1 GeV over a dephasing length of the order of 1 cm, where accelerated electrons outrun a proper accelerating phase.

The said inner shell electrons from ionized N$^{6+}$ and N$^{7+}$ are located near the bubble center on the propagation axis, where the wake potential is a maximum and the expelling ponderomotive force of the laser pulse is a minimum. Contrary to pre-ionized free electrons, whose trajectories move along a narrow sheath outside the bubble, the ionized electrons emitted from the inner shell move close to the bubble axis toward the back of the bubble where the wake potential is a minimum, and eventually trapped into the wakefield in condition that electrons gain a sufficient kinetic energy required for trapping, as shown in the electron trajectory 106, while the electron shown in the trajectory 107, ionized earlier and off-axis, slips over the potential well and is not trapped. This mechanism called as ionization-induced injection occurs at the intensity as low as the optical field ionization threshold for the inner shell electrons of impurity gas and significantly increases the trapped charge. As trapping occurs close to the bubble axis, amplitudes of the betatron oscillation after trapping decrease compared to the self-injection from the electron sheath. According to theoretical considerations on the ionization-induced injection, for trapping electrons ionized at the peak of the laser electric field, the minimum laser intensity is given by $1-\gamma_p^{-1} \leq 0.64 a_0^2$, where $\gamma_p$ is the Lorentz factor defined as $\gamma_p = (1-\beta_p^2)^{-1/2}$ and $\beta_p$ is the phase velocity of the plasma wave. For electrons to be trapped at or in front of the laser envelope, the intensity must be $a_0 \geq 21.7$ for $\gamma_p = 33$. The 1D PIC simulations show that the maximum number of trapped electrons is saturated to be approximately $N_{e\,max} \sim 5 \times 10^6$ μm$^{-2}$ at the mixed gas length $L_{mix} = 1000\lambda_0$ for the plasma density $n_e = 0.001 n_c$ ($1.7 \times 10^{18}$ cm$^{-3}$) with the nitrogen concentration of $\alpha_N = 1\%$, and the laser parameters $a_0 = 2$ and $c\tau_0 \approx 15\lambda_0$ due to the beam loading effects and initially trapped particle loss from the separatrix in the phase space, where $\lambda_0$ is the laser wavelength and $n_c$ is the critical plasma density defined as $n_c = m_e \omega_L^2/4\pi e^2 = \pi/(r_e \lambda_L^2) \approx 1.115 \times 10^{21}$ [cm$^{-3}$]/($\lambda_L$ [μm])$^2$. The number of trapped electrons scales as $N_e$ [μm$^{-2}$] $8 \times 10^7 \alpha_N k_p L_{mix} (n_e/n_c)^{1/2}$ for $\alpha_N k_p L_{mix} \leq 2$. The energy spread is also proportional to both the mixed gas length and the nitrogen concentration. According to the 2D-PIC simulation for $a_0 = 2$, the energy spread of a trapped electron beam may scale as $\delta E/E = 0.02[\%](L_{mix}/\lambda_L)(n_e/10^{17}$ cm$^{-3})^{-1/2}$, while the transverse normalized emittance is estimated to be $\epsilon_{n0} \approx 0.5$ [μm]$a_0^{1/2}(n_e/10^{17}$ [cm$^{-3}$])$^{-1/2}$.

In the bubble (blowout) regime for $a_0 \geq 2$, since an electron-evacuated cavity shape is determined by balancing the Lorentz force of the ion sphere exerted on the electron sheath with the ponderomotive force of the laser pulse, the bubble radius $R_B$ is approximately given as $k_p R_B \approx 2\sqrt{a_0}$, where $k_p = (4\pi r_e n_e)^{1/2}$ is the plasma wavenumber evaluated with the unperturbed on-axis density $n_e$, and the classical electron radius $r_e = e^2/m_e c^2 = 2.818 \times 10^{-13}$ cm with electron charge e, mass $m_e$ and vacuum light velocity c. The accelerating field $E_z$ is given by $E_z/E_0 = (\frac{1}{2})\alpha k_p R_B$, where $E_0 = mc\omega_p/e \approx 96$ [GV/m]$(n_e/10^{18}$ [cm$^{-3}$])$^{1/2}$ and $\alpha$ represents a factor taking into account the beam loading and the difference between the simulation and theoretical estimation. The maximum energy gain limited due to dephasing is given by $$\Delta\gamma_{max} = W_{max}/m_e c^2 \approx (\tfrac{2}{3})\alpha \kappa_{self} a_0 (n_c/n_e),$$

where $\kappa_{self} = (a_0^2/8)\{(1+a_0^2/2)^{1/2} - 1 - \ln[((1+a_0^2/2)^{1/2} + 1]/2)\}^{-1}$ is a correction factor of the group velocity for a self-guided relativistic laser pulse, of which the relativistic factor related to the group velocity $\beta_g = v_g/c$ is given by $\gamma_g^2 = 1/(1-\beta_g^2) \approx \kappa_{self}(\omega_L^2/\omega_p^2) = \kappa_{self}(n_c/n_e) = \kappa_{ch}\gamma_{g0}^2$, where $\gamma_{g0} = \omega_L/\omega_p$ is the relativistic factor for the linear group velocity for $a_0^2$ 1. The dephasing length $L_{dp}$ for self-guided bubble regime is given by $k_p L_d \approx (\tfrac{2}{3}) k_p R_B \gamma_g^2 = (4/3)\sqrt{a_0}\kappa_{self}(n_c/n_e)$. The important parameters of a laser plasma accelerator for reaching a given energy $E_b$ are summarized as follows:

The operating plasma density is determined by $$n_e = \frac{2}{3}\alpha\kappa_{self} a_0 \frac{n_c}{\Delta\gamma_{max}} \approx 1.9 \times 10^{18} [\text{cm}^{-3}] \kappa_{self} a_0 \left(\frac{1\ \mu\text{m}}{\lambda_L}\right)^2 \left(\frac{200\ \text{MeV}}{E_b/\alpha}\right).$$

The accelerator length is set to be equal to the dephasing length as $$L_{acc} = L_{dp} \approx \sqrt{\frac{3}{2}} \frac{(\Delta\gamma_{max}/\alpha)^{3/2}}{\pi \kappa_{self}^{1/2} a_0} \lambda_L \approx \frac{3.1 [\text{mm}]}{\kappa_{self}^{1/2} a_0}\left(\frac{\lambda_L}{1\ \mu\text{m}}\right)\left(\frac{E_b/\alpha}{200\ \text{MeV}}\right)^{3/2}.$$

The pump depletion length due to pulse front erosion becomes $$L_{pd} \approx c\tau_L \frac{n_c}{n_e} = \frac{3}{2}\frac{c\tau_L \Delta\gamma_{max}/\alpha}{\kappa_{self} a_0} \approx \frac{5[\text{mm}]}{\kappa_{self} a_0}\left(\frac{\tau_L}{30\ \text{fs}}\right)\left(\frac{E_b/\alpha}{200\ \text{MeV}}\right).$$

The pulse duration required for satisfying a dephasing length longer than a pump depletion length is $$\tau_L \geq 18 [\text{fs}] \kappa_{self}^{1/2}\left(\frac{\lambda_L}{1\ \mu\text{m}}\right)\left(\frac{E_b/\alpha}{200\ \text{MeV}}\right)^{1/2}.$$

The matched spot radius is given by $$r_m \approx 3.9 [\mu\text{m}] \frac{R_m}{\sqrt{\kappa_{self} a_0}}\left(\frac{\lambda_L}{1\ \mu\text{m}}\right)\left(\frac{E_b/\alpha}{200\ \text{MeV}}\right)^{1/2}.$$

-continued where $$R_m = k_p r_m = \left\{ \frac{\ln(1 + a_0^2/2)}{\sqrt{1 + a_0^2/2} - 1 - 2\ln\left[\left(\sqrt{1 + a_0^2/2} + 1\right)/2\right]} \right\}^{1/2}$$

The corresponding matched power is $$P_L = \frac{k_p^2 r_L^2 a_0^2}{32} P_c \approx 0.312 [\text{TW}] \frac{a_0 R_m^2}{\kappa_{self}} \left( \frac{E_b/\alpha}{200 \text{ MeV}} \right)$$

The required laser pulse energy is given by $U_L = P_L \tau_L$.

Assuming the beam loading efficiency $\eta_b \equiv 1 - E_z^2/E_M^2$ defined by the fraction of the plasma wave energy absorbed by particles of the bunch with the root mean square (r.m.s) radius $\tau_b$, the beam-loaded field is given by $E_z = \sqrt{1-\eta_b} E_M = \alpha E_M$, where $E_M$ is an accelerating field without beam loading. Thus a loaded charge is calculated as $$Q_b \approx \frac{e}{4k_L r_e} \frac{\eta_b k_p^2 \sigma_b^2}{(1-\eta_b)} \frac{E_z}{E_0} \left(\frac{n_c}{n_e}\right)^{1/2} \approx 76[\text{pC}] \frac{\eta_b k_p^2 \sigma_b^2}{(1-\eta_b)} \frac{E_z}{E_0} \left(\frac{n_e}{10^{18}[\text{cm}^{-3}]}\right)^{-1/2}.$$

Using the plasma density $n_e$, the loaded charge is given by $$Q_b \approx 55[\text{pC}] \frac{\eta_b k_p^2 \sigma_b^2}{\kappa_{self}^{1/2} \sqrt{1-\eta_b}} \left(\frac{\lambda_L}{1 \text{ } \mu m}\right) \left(\frac{E_b/\alpha}{200 \text{ MeV}}\right)^{1/2} \approx$$

$$55[\text{pC}] \frac{1-\alpha^2}{\alpha^{3/2}} \frac{k_p^2 \sigma_b^2}{\kappa_{self}^{1/2}} \left(\frac{\lambda_L}{1 \text{ } \mu m}\right) \left(\frac{E_b}{200 \text{ MeV}}\right)^{1/2}.$$

A field reduction factor $\alpha$ for accelerating a charge of electrons $Q_b$ up to an energy $E_b$ is obtained from $\alpha^2 + C\alpha^{3/2} - 1 = 0$, where $C \equiv (Q_b/55 \text{ pC}) \kappa_{self}^{1/2} (k_p^2 \tau_b^2)^{-1} (1 \text{ } \mu m/\lambda_L)^{-1} (E_b/200 \text{ MeV})^{-1/2}$.

Figure 6:
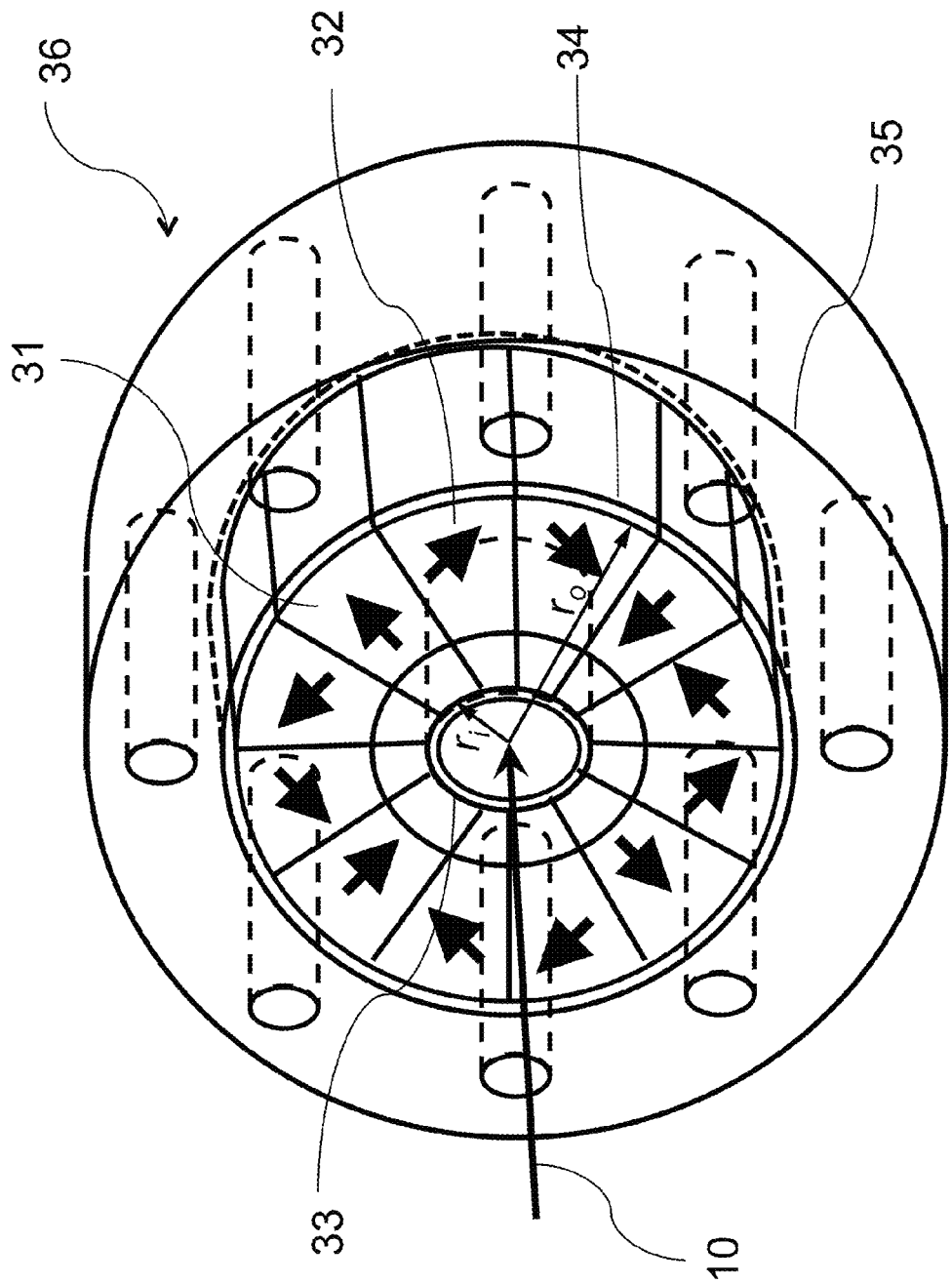
FIG. 6 shows a schematic view of a miniature permanent magnet quadrupole (PMQ).

6.3. Detailed Description of the Beam Focusing System, Undulator and Beam Separator Beam Focusing System Beam transport and imaging from the laser plasma accelerator 6 to the undulator 13 is provided by a beam focusing system 12 with short focal length. The field gradient of the two dimensional Halbach-type permanent quadrupole magnet (PMQ) as shown in FIG. 6 is given by $B' = 2B_r(r_i^{-1} - r_o^{-1})$, where $B_r$ is the tip field strength, $r_i$ is the bore radius and $r_o$ is the outer radius of PMQ. With $B_r = 1.45$ T for NdFeB material and $r_i = 2.5$ mm, one can obtain the field gradient $B' = 1160$ [T/m](1-2.5 [mm]/$r_o$). FIG. 6 illustrates schematically a twelve segments Halbach-type PMQ 31, 32 of a set of the quadrupole magnet 36, including a housing 33, 34 and a bracket 35 for supporting and positioning the PMQ. The quadrupole field is composed of four radially wedges of permanent magnet material 31, e.g., $Nd_2Fe_{14}B$ or SmCO, with a high remanent field, of which the direction of magnetization is indicated by arrows. The outer field closure is formed by eight wedges of permanent magnet material 32. Since the four main wedges are strongly attracted toward of the center of the quadrupole, their mechanical precision and field accuracy can be achieved by the insertion of a non-magnetic precision cylinder 33 into the center of the PMQ and by the housing case 34 outside the permanent quadrupole magnet (PMQ).

Figure 7:
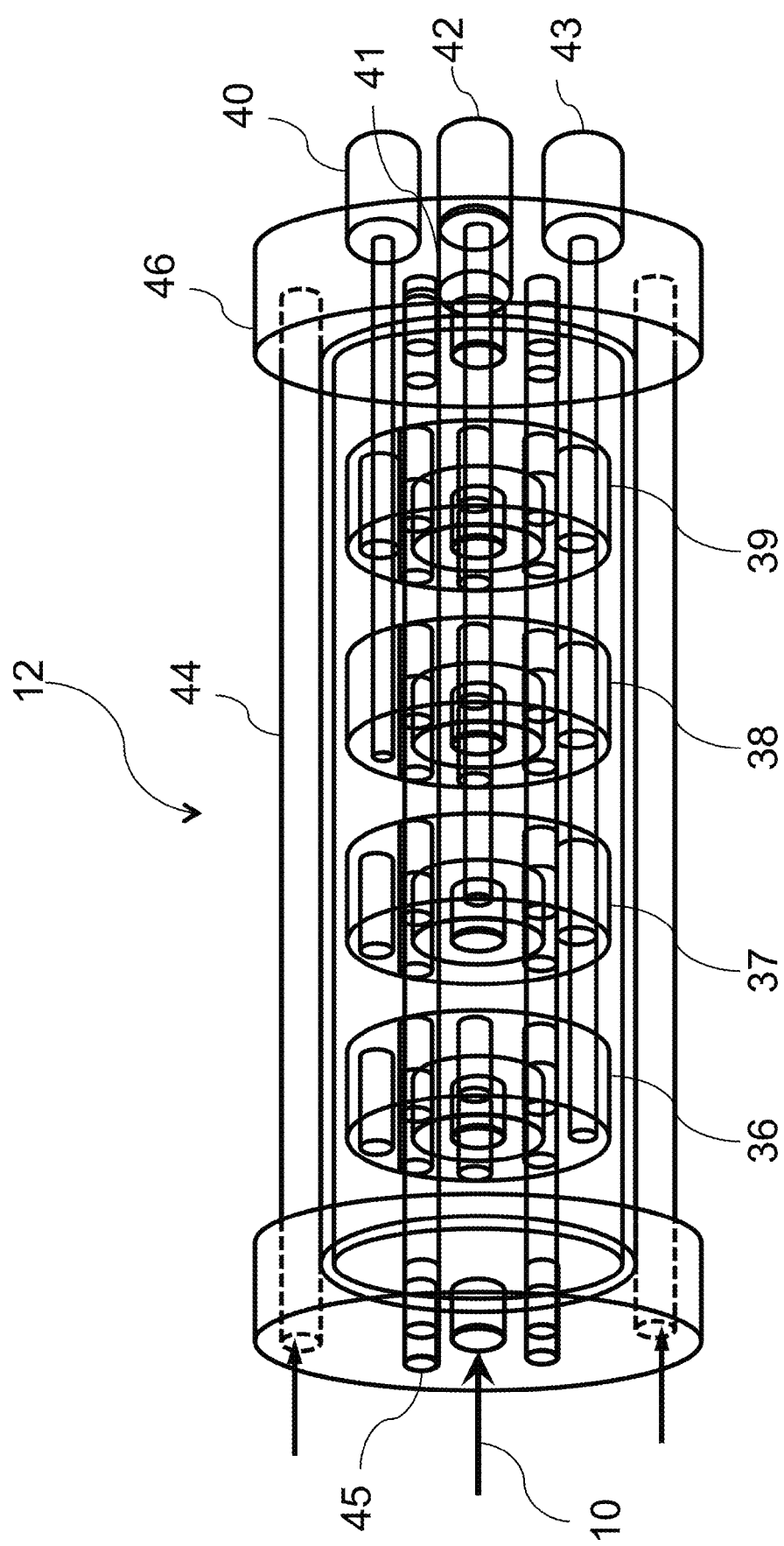
FIG. 7 shows an example of a beam focusing system comprising four permanent magnet quadrupoles (PMQ) of the type represented by FIG. 6.

As shown in FIG. 7, the beam focusing system 12 comprises two to four permanent quadrupole magnets (PMQ), e.g. a doublet (FD), a triplet (FDF), or a quadruplet (FFDD) 36-39 installed into a housing chamber 46 with water cooling tubes 44. The longitudinal position of each permanent quadrupole magnet (PMQ) along the electron beam axis is optimized with a computer controlled mover system 40-43, comprising a vacuum linear motion manipulator driven by a stepping motor. Alignment of permanent quadrupole magnets (PMQ) is precisely constrained by a rail system 45.

Undulator

Figure 8:
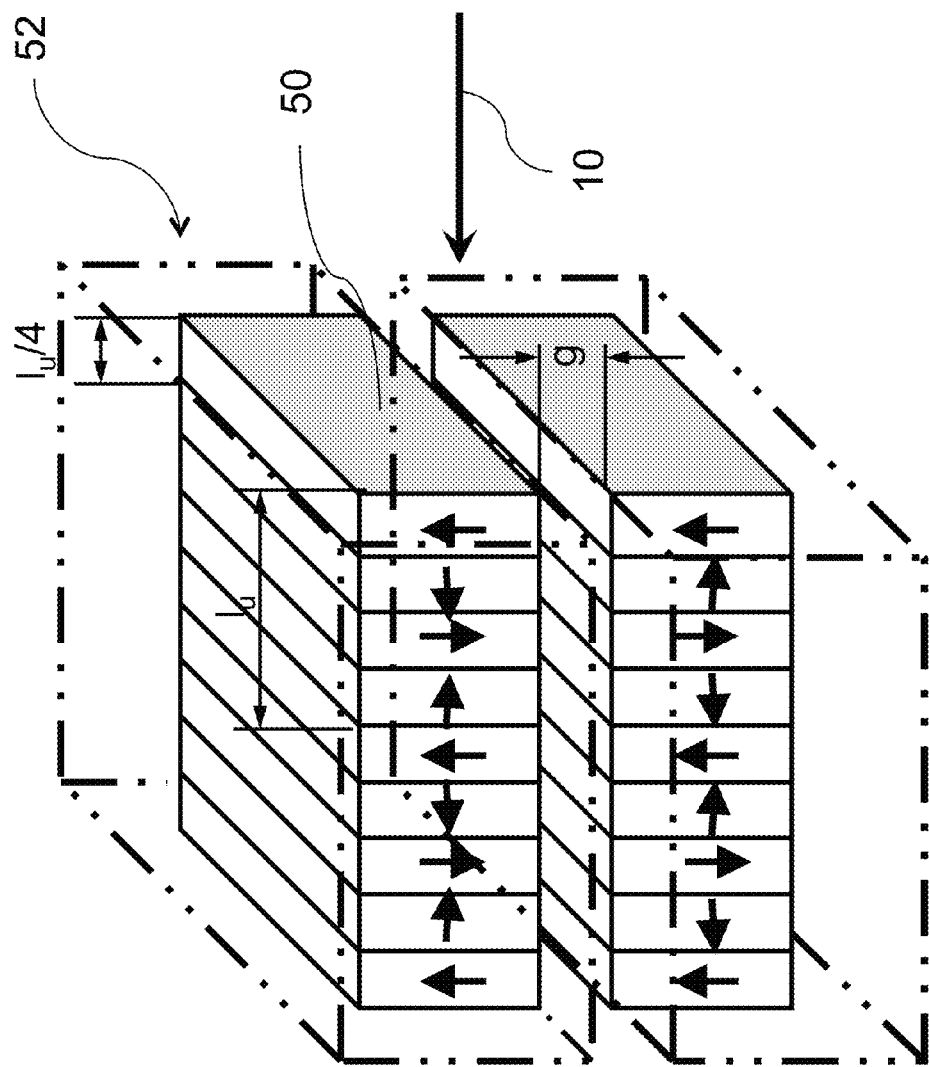
FIG. 8 shows schematically a planar undulator made of pure permanent magnets producing a vertical field.
Figure 9:
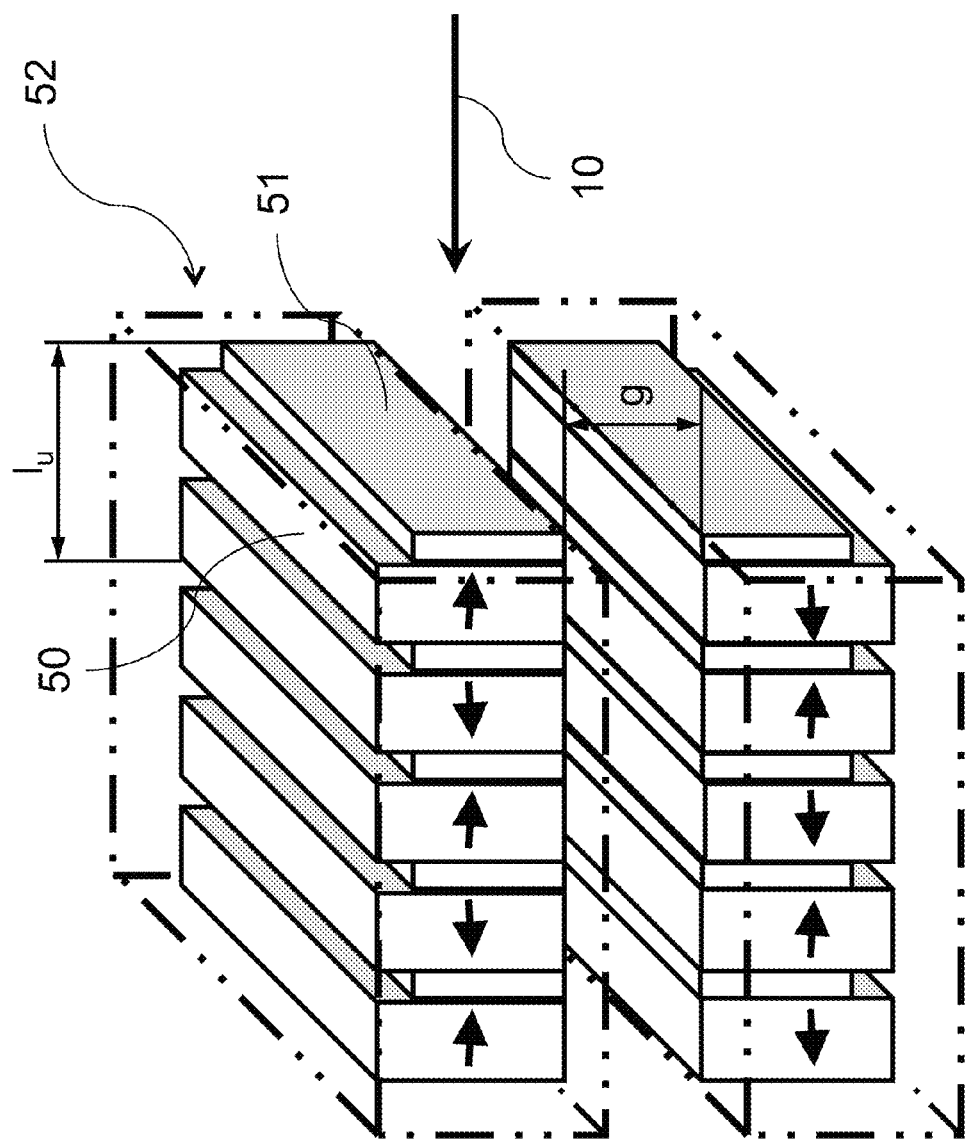
FIG. 9 shows schematically a hybrid planar undulator made of permanent magnets and ferromagnetic material, e.g., iron or cobalt steel.

For a Extreme UltraViolet light source based on Free-Electron Laser, a planar undulator comprising alternating dipole magnets 52 is used, e.g., a pure permanent magnet (PPM) undulator with $Nd_2Fe_{14}B$ blocks 50 as shown in FIG. 8 or a hybrid undulator comprising pure permanent magnets 50 and ferromagnetic poles 51 as shown in FIG. 9, e.g. a high saturation cobalt steel such as vanadium permendur or a simple iron. For a hybrid undulator, the thickness of the pole and magnet is optimized in order to maximize the peak field. In FIGS. 8 and 9, the arrows represent the direction of magnetization in the magnet blocks, of which a period is $\lambda_u$. The minimum distance between the magnet jaws is a gap g. The peak field $B_u$ of the gap is estimated in terms of the gap g and period $\lambda_u$ according to $B_u = a \text{ [T]} \exp[b(g/\lambda_u) + c(g/\lambda_u)^2]$ for gap range $0.1 < g/\lambda_u < 1$, where $a = 2.076$ T, $b = -3.24$, $c = 0$ for the pure permanent magnets planar undulator, $a = 3.694$ T, $b = -5.068$, $c = 1.520$ for the hybrid undulator with vanadium permendur, and $a = 3.381$ T, $b = -4.730$, $c = 1.198$ for the hybrid undulator with iron.

As shown in FIGS. 10A and 10B, the undulator 13 comprises a rectangular box frame 53, a gap adjusting mechanism 54 and cooling elements 55. The permanent magnet blocks 52 is attached to a thick base plate of the box frame 53 made of aluminium material. The alignment and gap of the undulator are adjusted by controlling the distance between two base plates of the box frame 53 with 4 or 6 adjusting mechanisms 54. Two monolithic water cooling elements 55 fabricated from tubing are connected to each magnet block 52.

Beam Separator

As shown in FIGS. 11A, 11B and 11C, a decelerated electron beam 10 after saturation is bent by a dipole field of permanent magnet (a beam separator 16) made of NdFeB material and dumped to a beam dump 17 made of copper with a water cooling element 56. The permanent magnet dipole (PMD) 16, e.g., Halbach-type permanent magnet dipole, comprises 8 wedges of the NdFeB material, of which the magnetization direction is shown by the arrows in FIG. 11B. The dipole field $B_D$ of the Halbach-type permanent magnet dipole is given by $B_D = B_r \ln(r_o/r_i)$, where $B_r$ is the tip field strength, $r_i$ is the bore radius and $r_o$ is the outer radius of the PMD. With $B_r = 1.45$ T for NdFeB material, $r_i = 5$ mm and $r_o = 100$ mm, one can obtain the dipole field $B_D = 4.34$ T. The mechanical precision and field accuracy of the permanent magnet dipole 16 can be achieved by the insertion of a nonmagnetic precision cylinder 57 into the center of the permanent magnet dipole and by the housing case 58 outside the permanent magnet dipole. The electron beam 10 bent by the permanent magnet dipole field 16 is dumped to the copper beam dump 17, while the Extreme UltraViolet radiation 14 is extracted through a narrow Extreme UltraViolet output hole 59 machined in the beam dump 17 at the edge of the permanent magnet dipole bore. The permanent magnet dipole length required for deflecting d≈2$r_i$ [mm] is given by $L_{PMD}$ [cm]=10[($r_i$/3.26 mm)($E_b$/1 GeV)]$^{1/2}$ for $B_D$=4.34 T ($r_o/r_i$=20). Since electrons lose energy by a factor of 1/e≃0.37 over the radiation length $X_0$=1.44 cm via electromagnetic cascades in the copper beam dump, almost all electrons with energy 1 GeV lose their energy inside the copper block with length 10$X_0$~15 cm and diameter 7$X_0$~10 cm. Both permanent magnet dipole and beam dump are cooled down by the water cooling elements 56.

The Free-Electron Laser Device

Figure 12:
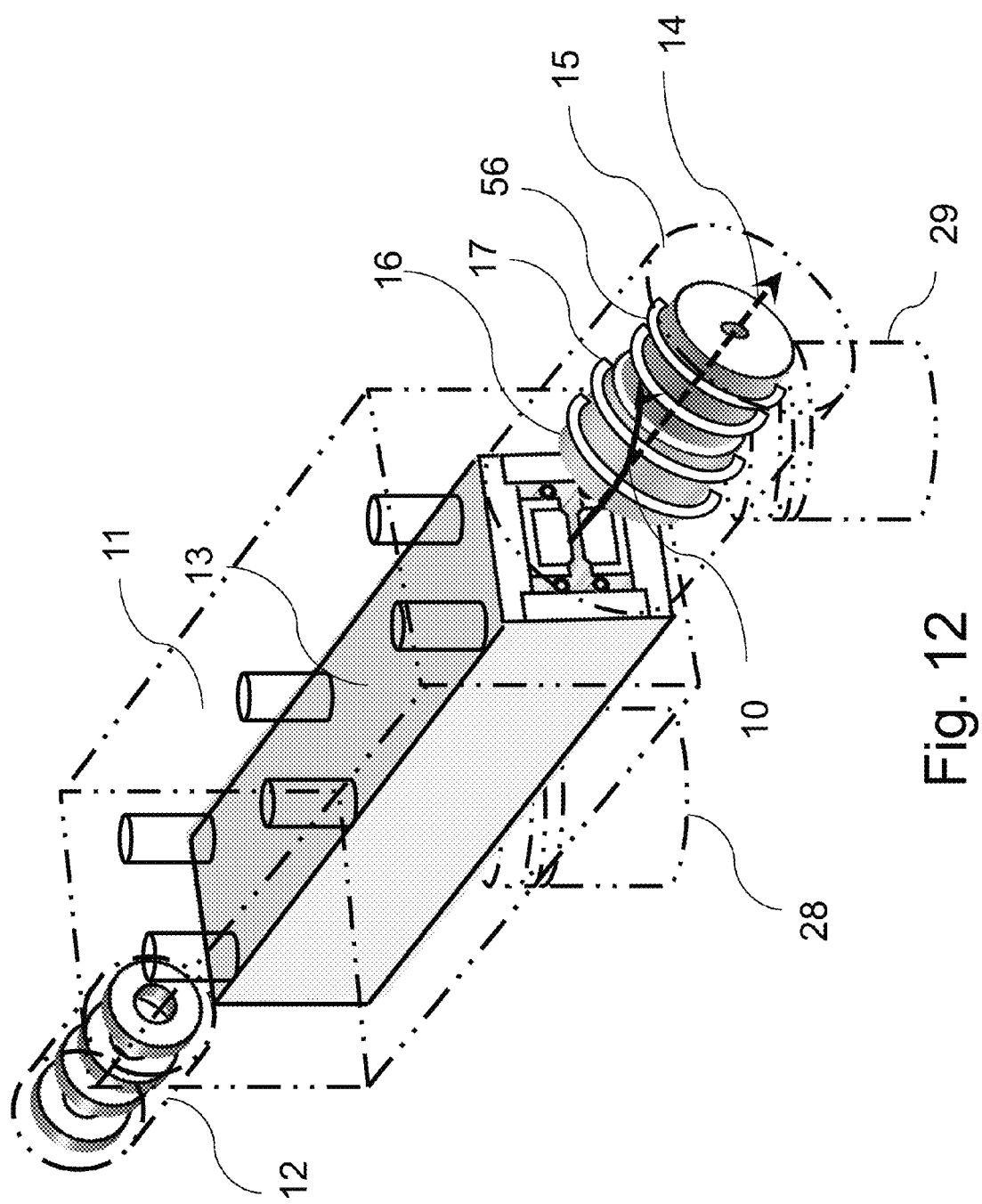
FIG. 12 illustrates a setup of a compact self-amplified spontaneous emission (SASE) Free-Electron Laser system comprising the beam focusing system of FIG. 4, the compact undulator of FIG. 5 and the beam dump system of FIG. 6.

As shown in FIG. 12, the Free-Electron Laser device comprising the beam focusing system 12, the undulator 13 and the beam separator 16 and beam dump 17 is installed into vacuum chambers 11, 15 with vacuum pumping systems 28, 29 that maintain a pressure of the order of 10$^{-4}$ Pa inside the chamber. The beam dump 17 connected to the beam separator 16 forms a monolithic device.

In self-amplified spontaneous emission (SASE) Free-Electron Laser process, coupling the electron bunch with a copropagating undulator radiation field induces the energy modulation of electrons that yields a current modulation of the bunch due to the dispersion of the undulator dipole fields, called microbunching. It means that the electrons are grouped into small bunches separated by a fixed distance that resonantly coincides with the wavelength of the radiation field. Consequently, the radiation field can be amplified coherently. When lacking an initial resonant radiation field, a seed may build up from spontaneous incoherent emission in the self-amplified spontaneous emission (SASE) process.

Design of Free-Electron Laser Based Extreme UltraViolet Light Source

A design of Free-Electron Laser based Extreme UltraViolet light source is made by the one-dimensional Free-Electron Laser theory as follows. The Free-Electron Laser amplication takes place in the undulator with the undulator period $\lambda_u$ at the resonant wavelength given by $$\lambda_X = \frac{\lambda_u}{2\gamma^2}\left(1 + \frac{K^2}{2}\right),$$

where $\gamma = E_b/m_e c^2$ is the relativistic factor of the electron beam energy $E_b$, and $K_u$=0.934$B_u$ [T]$\lambda_u$ [cm]=$\gamma\theta_e$ is the undulator parameter, which is related to the maximum electron deflection angle $\theta_e$.

In the high-gain regime required for the operation of a self-amplified spontaneous emission (SASE) Free-Electron Laser, an important parameter is the Pierce parameter $\tau_{FEL}$ given by $$\rho_{FEL} = \frac{1}{2\gamma}\left[\frac{I_b}{I_A}\left(\frac{\lambda_u K_u A_u}{2\pi\sigma_b}\right)^2\right]^{1/3}$$

where $I_b$ is the beam current, $I_A$=17 kA is the Alfven current, $\sigma_b$ is the root mean square (r.m.s) transverse size of the electron bunch, and the coupling factor is $A_u$=1 for a helical undulator and $A_u$=$J_0(\xi)-J_1(\xi)$ for a planar undulator, where $\xi = K_u^2/[4(1+K_u^2/2)]$ and $J_0$ and $J_1$ are the Bessel functions of the first kind.

Another important dimensionless parameter is the longitudinal velocity spread $\Lambda$ of the beam normalized by the Pierce parameter:

$$\Lambda^2 = \frac{1}{\rho_{FEL}^2}\left[\left(\frac{\sigma_\gamma}{\gamma}\right)^2 + \left(\frac{\varepsilon\lambda_u}{4\lambda_X\beta}\right)^2\right] = \frac{1}{\rho_{FEL}^2}\left[\left(\frac{\sigma_\gamma}{\gamma}\right)^2 + \left(\frac{\varepsilon_n^2}{2\sigma_b^2(1+K_u^2/2)}\right)^2\right],$$

where $\sigma_\gamma/\gamma$ is the relative root mean square (r.m.s.) energy spread, $\varepsilon$ is the r.m.s. transverse emittance, $\beta = \sigma_b^2/\varepsilon$ is the beta function provided by the guiding field (undulator plus external focusing) and $\varepsilon_n$ is the normalized emittance defined as $\varepsilon_n \equiv \gamma\varepsilon$ assuming that a beta function is constant along the length of the undulator.

A e-folding gain length $L_{gain}$ over which the power grows exponentially according to exp(2s/$L_{gain}$) is given by $$L_{gain} = \frac{\lambda_u}{4\pi\sqrt{3}\rho_{FEL}}(1+\Lambda^2).$$

In order to minimize the gain length, one needs a large Pierce parameter $\rho_{FEL}$ and a normalized longitudinal velocity spread $\Lambda$ sufficiently low compared to 1 that means a sufficiently small energy spread $\sigma_\gamma/\gamma$ and $\varepsilon$. This expression applies to moderately small beam size $\sigma_b$ such that the diffraction parameter B 1 where B is defined as $$B = \frac{16\pi^2 A_u \sigma_b^2}{\lambda_X \lambda_u}\left[\frac{K_u^2/2}{\gamma(1+K_u^2/2)}\frac{I_b}{I_A}\right]^{1/2}.$$

A saturation length $L_{sat}$ required to saturate the amplification can be expressed as $$L_{sat} = L_{gain} \ln\left[\left(\frac{\Lambda^2+3/2}{\Lambda^2+1/6}\right)\frac{P_{sat}}{P_{in}}\right],$$

where $P_{in}$ and $P_{sat}$ are an input and a saturated power.

The input $P_{in}$ and saturated power $P_{sat}$ are related to an electron beam power $P_b$ according to $P_b = \gamma I_b m_e c^2 = I_b E_b$, $P_{sat} \cong 1.37\rho_{FEL}P_b\exp(-0.82\Lambda^2)$, $P_{in} \cong 3\sqrt{4\pi}\rho_{PEL}^2 P_b[N_{\lambda_X}\ln(N_{\lambda_X}/\rho_{FEL})]^{-1/2}$, where $N_{\lambda_X}$ is the number of electrons per wavelength given by $N_{\lambda_X} = I_b\lambda_X/(ec)$.

6.4. Embodiment of a Free-Electron Laser Used as an Extreme UltraViolet Source at 13.5 nm Wavelength A fiber laser driven Laser Plasma Accelerator (LPA) based Free-Electron Laser produced Extreme UltraViolet radiation source at $\lambda_X$=13.5 nm wavelength using the undulator with period $\lambda_u$=5 mm (Case A), 10 mm (Case B), 15 mm (Case C), 20 mm (Case D) and 25 mm (Case E), all cases of which have the gap-period ratio g/$\lambda_u$=0.2, e.g. g=1 mm (Case A), 2 mm (Case B), 3 mm (Case C), 4 mm (Case D) and 5 mm (Case E), respectively. A hybrid undulator comprising NdFeB materials with grade N52, e.g., VACODYM® 722HR, and ferromagnetic materials such as tempered Co—Fe alloys (vanadium permendur), e.g., VACOFLUX® 50, provide the peak magnetic field $B_u$ [T]=3.694exp(−5.068×0.2+1.520×0.2²)=1.425. The corresponding undulator parameter becomes $K_u=0.1331\lambda_u$ [mm]=0.6655, 1.331, 1.9965, 2.662, 3.3275 for $\lambda_u$ [mm]=5, 10, 15, 20, 25.

The electron beam energy $E_b$ required for producing the Extreme UltraViolet radiation at the wavelength $\lambda_X$=13.5 nm is given by $\gamma=192.45\lambda_u^{1/2}(1+0.008858\lambda_u^2)^{1/2}$, i.e., $E_b$ [MeV]=$98.45\lambda_u^{1/2}(1+0.008858\lambda_u^2)^{1/2}$. For Case A to E, $\gamma$=475.6, 835.7, 1290, 1834, 2460 and $E_b$ [MeV]=243, 427, 659, 937, 1257.

The Laser Plasma Accelerator (LPA) can provide a high-peak current bunched beam, e.g., $I_A$=50 kA for electron charge $Q_b$=0.5 nC and bunch duration $\tau_b$ 10 fs. A fiber laser pulse with wavelength $\lambda_L$=1 μm after compression is focused on the entrance of gas cell at the normalized laser field $a_0$=2 corresponding to the laser intensity I=5.5×10$^{18}$ Wcm$^{-2}$. Self-guided propagation of such laser pulse in the gas cell requires the group velocity correction factor $\kappa_{self}$=1.19 and the matched spot radius $R_m \equiv k_p r_m$=3.2. The wakefield reduction factor α due to loaded charge $Q_b$ is calculated from $\alpha^2+C\alpha^{3/2}-1=0$ for the electron beam radius $k_p\sigma_b$=1, where the coefficients are C=9.0, 6.8, 5.5, 4.6, 4.0 as α=0.223, 0.267, 0.302, 0.335, 0.364, respectively, for Case A to E.

The important Laser Plasma Accelerator (LPA) parameters are provided as follows:
(1) The operating plasma density; $n_e[10^{17}$ cm$^{-3}$]=8.3, 5.6, 4.2, 3.2, 2.6
(2) The accelerator length; $L_{acc}$ [mm]=18, 32, 51, 74, 102
(3) The required pulse duration; $\tau_L$ [fs]=46, 56, 65, 73, 82
(4) The matched spot radius; $r_m$ [μm]=19, 23, 27, 30, 34
(5) The matched power; $P_L$ [TW]=29, 43, 59, 75, 93
(6) The required laser pulse energy; $U_L$ [J]=1.34, 2.40, 3.79, 5.52, 7.57

For the Free-Electron Laser operation, the coupling factor $A_u(\xi)$ are $A_u$=0.9527, 0.8696, 0.8083, 0.7711, 0.7486 with $\xi$=0.09065, 0.2349, 0.3329, 0.3899, 0.4235 for Case A to E, respectively. The root mean square (r.m.s) transverse size of the electron bunch is set to $\sigma_b$=25 μm in the undulator and is usually much larger than the normalized transverse emittance $\epsilon_n$ of the order of 1 μm for the Laser Plasma Accelerator (LPA) produced electron beam. For the peak current $I_b$=50 kA with the number of electrons per wavelength $N_{\lambda_N}$=1.4×10$^7$ and the diffraction parameter B 1, the important Free-Electron Laser parameters are given as follows according to the one-dimensional Free-Electron Laser theory:

(1) The Pierce parameter; $\rho_{FEL}$ [%]=1.117, 1.507, 1.597, 1.596, 1.572
(2) The longitudinal velocity spread; Λ≈1 for setting $\sigma_\gamma/\gamma \approx \rho_{FEL}$
(3) The e-folding gain length; $L_{gain}$ [mm]=41, 61, 86, 115, 146
(4) The saturated power; $P_{sat}$ [GW]$\cong 0.6\rho_{FEL}P_b$=82, 194, 317, 451, 596
(5) The input power; $P_{in}$ [MW]=0.94, 3.03, 5.26, 7.48, 9.72
(6) The saturation length; $L_{sat}$ [mm]=499, 721, 1016, 1355, 1723
(7) The total number of periods; $N_u$=100, 72, 68, 68, 69.
(8) The spectral bandwidth; $\Delta\lambda_X/\lambda_X$ [%]~$1/N_u$≈1.0, 1.4, 1.5, 1.5, 1.5
(9) The r.m.s. radiation cone angle;

$$\theta_{rms}[\mu\text{rad}] = \frac{1}{2\gamma}\left(\frac{1+K_u^2/2}{N_u}\right)^{1/2} = 116, 97, 82, 71, 63$$

(10) The average power at the repetition frequency $f_{rep}$ [MHz];

$P_{av}$ [kW]~$P_{sat}\tau_X f_{rep}$=(0.82,1.94,3.17,4.51,5.96)×$f_{rep}$ [MHz], assuming the radiation duration $\tau_X \approx \tau_b$~10 fs.

The repetition rate $f_{rep}$ to be required for generating the average Extreme UltraViolet power of $P_{EUV}$ =1 kW yields $f_{rep}$ [MHz]≈$P_{EUV}/(P_{sat}\tau_X)$=1.22, 0.515, 0.315, 0.223, 0.168. For the production of 1 kW Extreme UltraViolet radiation, the average fiber laser power yields $P_{Lav}$ [MW]≈$U_L f_{rep}$=1.63, 1.24, 1.19, 1.22, 1.27

Consequently, the minimum average laser power takes place for Case C with the undulator period 15 mm. The average beam power yields $P_{bav}$ [kW]=$Q_b f_{rep} E_b$≈148, 110, 104, 104, 105. The efficiency of the electron beam acceleration is $\eta_{laser \rightarrow beam}$ [%]=$P_{bav}/P_{Lav}$≈9.1, 8.9, 8.7, 8.5, 8.3. The efficiency of the production of Extreme UltraViolet radiation yields $\eta_{laser \rightarrow EUV}$ [%]=0.061, 0.081, 0.084, 0.082, 0.079

Said Laser Plasma Accelerator (LPA) and Free-Electron Laser parameters for Case A to E producing the Extreme UltraViolet radiation of 1 kW at 13.5 nm wavelength are summarized as shown in Table 1.

TABLE 1

Examples of the fiber laser driven Laser Plasma Accelerator (LPA) based Free-Electron Laser Extreme UltraViolet light source at 13.5 nm

| Case | A | B | C | D | E |
|---|---|---|---|---|---|
| Fiber laser parameters | | | | | |
| Laser wavelength [μm] | 1 | 1 | 1 | 1 | 1 |
| Average laser power [MW] | 1.63 | 1.24 | 1.19 | 1.22 | 1.27 |
| Repetition rate [MHz] | 1.22 | 0.515 | 0.315 | 0.223 | 0.168 |
| Laser energy per pulse [J] | 1.34 | 2.40 | 3.79 | 5.52 | 7.57 |
| Peak power [TW] | 29 | 43 | 59 | 75 | 93 |
| Pulse duration [fs] | 46 | 56 | 65 | 73 | 82 |
| Matched spot radius [μm] | 19 | 23 | 27 | 30 | 34 |
| LPA parameters | | | | | |
| Electron beam energy [MeV] | 243 | 427 | 659 | 937 | 1257 |
| Plasma density [10$^{17}$ cm$^{-3}$] | 8.3 | 5.6 | 4.2 | 3.2 | 2.6 |
| Accelerator length [mm] | 18 | 32 | 51 | 74 | 102 |
| Charge per bunch [nC] | 0.5 | 0.5 | 0.5 | 0.5 | 0.5 |
| Field reduction factor α | 0.223 | 0.267 | 0.302 | 0.325 | 0.364 |
| Bunch duration [fs] | 10 | 10 | 10 | 10 | 10 |

TABLE 1-continued

Examples of the fiber laser driven Laser Plasma Accelerator (LPA) based
Free-Electron Laser Extreme UltraViolet light source at 13.5 nm

| Case | A | B | C | D | E |
|---|---|---|---|---|---|
| Energy spread [%] | ~1.1 | ~1.5 | ~1.6 | ~1.6 | ~1.6 |
| Normalized emittance [mm mrad] | ~1 | ~1 | ~1 | ~1 | ~1 |
| Transverse beam size [μm] | 25 | 25 | 25 | 25 | 25 |
| Peak current [kA] | 50 | 50 | 50 | 50 | 50 |
| Average beam power [kW] | 148 | 110 | 104 | 104 | 105 |
| Efficiency of laser to beam [%] | 9.1 | 8.9 | 8.7 | 8.5 | 8.3 |
| FEL parameters | | | | | |
| Undulator period [mm] | 5 | 10 | 15 | 20 | 25 |
| Radiation wavelength [nm] | 13.5 | 13.5 | 13.5 | 13.5 | 13.5 |
| Gap [mm] | 1 | 2 | 3 | 4 | 5 |
| Peak magnetic field [T] | 1.425 | 1.425 | 1.425 | 1.425 | 1.425 |
| Undulator parameter $K_u$ | 0.666 | 1.33 | 2.00 | 2.66 | 3.33 |
| Pierce parameter [%] | 1.117 | 1.507 | 1.597 | 1.596 | 1.572 |
| Gain length [mm] | 41 | 61 | 86 | 115 | 146 |
| Saturation length [mm] | 499 | 721 | 1016 | 1355 | 1723 |
| Number of periods | 100 | 72 | 68 | 68 | 69 |
| Spectral bandwidth [%] | 1.0 | 1.4 | 1.5 | 1.5 | 1.5 |
| r.m.s. Radiation cone angle [μrad] | 116 | 97 | 82 | 71 | 63 |
| Input power [MW] | 0.94 | 3.03 | 5.26 | 7.48 | 9.72 |
| Saturated power [GW] | 82 | 194 | 317 | 451 | 596 |
| Duration of EUV pulse [fs] | 10 | 10 | 10 | 10 | 10 |
| Average EUV power [kW] | 1 | 1 | 1 | 1 | 1 |
| Efficiency of EUV generation [%] | 0.061 | 0.081 | 0.084 | 0.082 | 0.079 |

6.4. Embodiment of a Free-Electron Laser Used as an Extreme UltraViolet Source at 6.7 nm Wavelength A fiber laser driven Laser Plasma Accelerator (LPA) based Free-Electron Laser produced Extreme UltraViolet radiation source at $\lambda_X$=6.7 nm wavelength using the undulator with period $\lambda_u$=5 mm (Case A), 10 mm (Case B), 15 mm (Case C), 20 mm (Case D) and 25 mm (Case E), all cases of which have the gap-period ratio $g/\lambda_u$=0.2, e.g. g=1 mm (Case A), 2 mm (Case B), 3 mm (Case C), 4 mm (Case D) and 5 mm (Case E), respectively. A hybrid undulator comprising NdFeB materials with grade N52, e.g., VACODYM® 722HR, and ferromagnetic materials such as tempered Co—Fe alloys (vanadium permendur), e.g., VACOFLUX® 50, provide the peak magnetic field $B_u$ [T]=3.694exp(−5.068× $0.2+1.520\times0.2^2$)=1.425. The corresponding undulator parameter becomes $K_u$=0.1331$\lambda_u$ [mm]=0.6655, 1.331, 1.9965, 2.662, 3.3275 for $\lambda_u$ [mm]=5, 10, 15, 20, 25.

The electron beam energy $E_b$ required for producing the Extreme UltraViolet radiation at the wavelength $\lambda_X$=6.7 is given by $\gamma=273.18\lambda_u^{1/2}(1+0.008858\lambda_u^2)^{1/2}$, i.e., $E_b$ [MeV]=98.45$\lambda_u^{1/2}(1+0.008858\lambda_u^2)^{1/2}$. For Case A to E, $\gamma$=675.1, 1186, 1830, 2604, 3492 and $E_b$ [MeV]=345, 606, 935, 1331, 1784.

The Laser Plasma Accelerator (LPA) can provide a high-peak current bunched beam, e.g., $I_A$=50 kA for electron charge $Q_b$=0.5 nC and bunch duration $\tau_b$ 10 fs. A fiber laser pulse with wavelength $\lambda_L$=1 μm after compression is focused on the entrance of gas cell at the normalized laser field $a_0$=2 corresponding to the laser intensity I=5.5×10$^{18}$ Wcm$^{-2}$. Self-guided propagation of such laser pulse in the gas cell requires the group velocity correction factor $\kappa_{self}$=1.19 and the matched spot radius $R_m \equiv k_p r_m$=3.2. The wakefield reduction factor α due to loaded charge $Q_b$ is calculated from $\alpha^2+C\alpha^{3/2}-1=0$ for the electron beam radius $k_p\sigma_b$=1, where the coefficients are C=7.55, 5.70, 4.59, 3.84, 3.32 as a=0.249, 0.295, 0.335, 0.369, 0.400, respectively, for Case A to E.

The important Laser Plasma Accelerator (LPA) parameters are provided as follows:

(1) The operating plasma density; $n_e$[10$^{17}$ cm$^{-3}$]=6.5, 4.4, 3.2, 2.5, 2.0

(2) The accelerator length; $L_{acc}$ [mm]=26, 47, 74, 109, 150

(3) The required pulse duration; $\tau_L$ [fs]=52, 63, 73, 83, 93

(4) The matched spot radius; $r_m$ [μm]=21, 26, 30, 34, 38

(5) The matched power; $P_L$ [TW]=37, 55, 75, 97, 120

(6) The required laser pulse energy; $U_L$ [J]=1.92, 3.47, 5.51, 8.06, 11.1

For the FEL operation, the coupling factor $A_u(\xi)$ are $A_u$=0.9527, 0.8696, 0.8083, 0.7711, 0.7486 with $\xi$=0.09065, 0.2349, 0.3329, 0.3899, 0.4235 for Case A to E, respectively. The root mean square (r.m.s) transverse size of the electron bunch is set to $\sigma_b$=25 μm in the undulator and is usually much larger than the normalized transverse emittance $\epsilon_n$ of the order of 1 μm for the Laser Plasma Accelerator (LPA) produced electron beam. For the peak current $I_b$=50 kA with the number of electrons per wavelength $N_{\lambda_X}$=7×10$^6$ and the diffraction parameter B 1, the important Free-Electron Laser parameters are given as follows according to the one-dimensional Free-Electron Laser theory:

(1) The Pierce parameter; $\rho_{FEL}$ [%]=0.787, 1.061, 1.125, 1.125, 1.107

(2) The longitudinal velocity spread; $\Lambda \approx 1$ for setting $\sigma_\gamma/\gamma \approx \rho_{FEL}$ (3) The e-folding gain length; $L_{gain}$ [mm]=58.4, 86.6, 123, 163, 207

(4) The saturated power; $P_{sat}$ [GW]$\cong 0.6\rho_{FEL}P_b$=82, 194, 317, 451, 596

(5) The input power; $P_{in}$ [MW]≈0.94, 3.05, 5.3, 7.5, 9.8

(6) The saturation length; $L_{sat}$ [mm]=709, 1024, 1441, 1923, 2445

(7) The total number of periods; $N_u$=142, 102, 96, 96, 98.

(8) The spectral bandwidth; $\Delta\lambda_X/\lambda_X$ [%]~1/$N_u$≈0.71, 0.98, 1.04, 1.04, 1.02

(9) The r.m.s. radiation cone angle; $\theta_{rms}$ [μrad]=69, 57, 48, 42, 37

(10) The average power at the repetition frequency $f_{rep}$ [MHz];

$$P_{av} [kW] \sim P_{sat}\tau_x f_{rep} = (0.82, 1.94, 3.17, 4.51, 5.96) \times f_{rep} [MHz],$$

assuming the radiation duration $\tau_x \approx \tau_b \sim 10$ fs. The repetition rate $f_{rep}$ to be required for generating the average EUV power of $P_{EUV}$=1.5 kW yields $f_{rep}$ [MHz]≈$P_{EUV}$/($P_{sat}\tau_x$)=1.83, 0.773, 0.473, 0.332, 0.252. For the production of 1.5 kW EUV radiation, the average fiber laser power yields $P_{Lav}$ [MW]≈$U_L f_{rep}$=3.52, 2.68, 2.60, 2.68, 2.80

Consequently, the minimum average laser power takes place for Case C with the undulator period 15 mm. The average beam power yields $P_{bav}$ [kW]=$Q_b f_{rep} E_b$≈316, 234, 221, 221, 225. The efficiency of the electron beam acceleration is $\eta_{laser \to beam}$ [%]=$P_{bav}/P_{Lav}$=8.97, 8.73, 8.49, 8.26, 8.03. The efficiency of the production of Extreme UltraViolet radiation yields $\eta_{laser \to EUV}$ [%]=0.043, 0.056, 0.058, 0.056, 0.054.

Said Laser Plasma Accelerator (LPA) and Free-Electron Laser parameters for Case A to E producing the Extreme UltraViolet radiation of 1 kW at 6.7 nm wavelength are summarized as shown in Table 2.

6.5 Embodiment of Tuning a Free-Electron Laser for the Wavelength Range from 5 nm to 15 nm The FEL amplification takes place in the undulator with the undulator period $\lambda_u$ at the resonant wavelength given by $$\lambda_X = \frac{\lambda_u}{2\gamma^2}\left(1 + \frac{K_u^2}{2}\right),$$

where $\gamma = E_b/m_e c^2$ is the relativistic factor of the electron beam energy $E_b$, $K_u$=0.934$B_u$ [T]$\lambda_u$ [cm]. Setting the peak magnetic field of the undulator to be $B_u$=1.425 T, the corresponding undulator parameter becomes $K_u$=0.1331$\lambda_u$ [mm]=1.9965 for $\lambda_u$=15 mm (CASE C). The electron beam energy $E_b$ required for producing the EUV radiation at the wavelength $\lambda_X$ is given by $$E_b [MeV] = 659\left(\frac{13.5 \text{ nm}}{\lambda_X}\right)^{1/2}$$

TABLE 2

Examples of the fiber laser driven Laser Plasma Accelerator (LPA) based Free-Electron Laser Extreme UltraViolet light source.

| Case | A | B | C | D | E |
|---|---|---|---|---|---|
| Fiber laser parameters | | | | | |
| Laser wavelength [μm] | 1 | 1 | 1 | 1 | 1 |
| Average laser power [MW] | 3.52 | 2.68 | 2.60 | 2.68 | 2.80 |
| Repetition rate [MHz] | 1.83 | 0.773 | 0.473 | 0.332 | 0.252 |
| Laser energy per pulse [J] | 1.92 | 3.47 | 5.51 | 8.06 | 11.1 |
| Peak power [TW] | 37 | 55 | 75 | 97 | 120 |
| Pulse duration [fs] | 52 | 63 | 73 | 83 | 93 |
| Matched spot radius [μm] | 21 | 26 | 30 | 34 | 38 |
| LPA parameters | | | | | |
| Electron beam energy [MeV] | 345 | 606 | 935 | 1331 | 1784 |
| Plasma density [$10^{17}$ cm$^{-3}$] | 6.5 | 4.4 | 3.2 | 2.5 | 2.0 |
| Accelerator length [mm] | 26 | 47 | 74 | 109 | 150 |
| Charge per bunch [nC] | 0.5 | 0.5 | 0.5 | 0.5 | 0.5 |
| Field reduction factor α | 0.249 | 0.295 | 0.335 | 0.369 | 0.400 |
| Bunch duration [fs] | 10 | 10 | 10 | 10 | 10 |
| Energy spread [%] | ~0.8 | ~1.1 | ~1.1 | ~1.1 | ~1.1 |
| Normalized emittance [mm mrad] | ~1 | ~1 | ~1 | ~1 | ~1 |
| Transverse beam size [μm] | 25 | 25 | 25 | 25 | 25 |
| Peak current [kA] | 50 | 50 | 50 | 50 | 50 |
| Average beam power [kW] | 316 | 234 | 221 | 221 | 225 |
| Efficiency of laser to beam [%] | 9.0 | 8.7 | 8.5 | 8.3 | 8.0 |
| FEL parameters | | | | | |
| Radiation wavelength [nm] | 6.7 | 6.7 | 6.7 | 6.7 | 6.7 |
| Undulator period [mm] | 5 | 10 | 15 | 20 | 25 |
| Gap [mm] | 1 | 2 | 3 | 4 | 5 |
| Peak magnetic field [T] | 1.425 | 1.425 | 1.425 | 1.425 | 1.425 |
| Undulator parameter $K_u$ | 0.666 | 1.33 | 2.00 | 2.66 | 3.33 |
| Pierce parameter [%] | 0.787 | 1.06 | 1.125 | 1.125 | 1.107 |
| Gain length [mm] | 58.4 | 86.6 | 123 | 163 | 207 |
| Saturation length [mm] | 709 | 1024 | 1441 | 1923 | 2445 |
| Number of periods | 142 | 102 | 96 | 96 | 98 |
| Spectral bandwidth [%] | 0.71 | 0.98 | 1.04 | 1.04 | 1.02 |
| r.m.s. Radiation cone angle [μrad] | 69 | 57 | 48 | 42 | 37 |
| Input power [MW] | 0.94 | 3.05 | 5.3 | 7.5 | 9.8 |
| Saturated power [GW] | 82 | 194 | 317 | 451 | 596 |
| Duration of EUV pulse [fs] | 10 | 10 | 10 | 10 | 10 |
| Average EUV power [kW] | 1.5 | 1.5 | 1.5 | 1.5 | 1.5 |
| Efficiency of EUV generation [%] | 0.043 | 0.056 | 0.058 | 0.056 | 0.054 |

The important Laser Plasma Accelerator (LPA) parameters are provided as a function of FEL wavelength $\lambda_X$:

(1) The operating plasma density;

$$n_e \approx 4.2 \times 10^{17} [\text{cm}^{-3}] \left(\frac{\lambda_X}{13.5 \text{ nm}}\right)^{1/2}$$

(2) The accelerator length;

$$L_{acc} \approx 51 [\text{mm}] \left(\frac{13.5 \text{ nm}}{\lambda_X}\right)^{3/4}$$

(3) The required pulse duration;

$$\tau_L = 65 [\text{fs}] \left(\frac{13.5 \text{ nm}}{\lambda_X}\right)^{1/4}$$

(4) The matched spot radius;

$$r_m \approx 27 [\mu\text{m}] \left(\frac{13.5 \text{ nm}}{\lambda_X}\right)^{1/4}$$

(5) The required laser peak power;

$$P_L \approx 59 [\text{TW}] \left(\frac{13.5 \text{ nm}}{\lambda_X}\right)^{1/2}$$

(6) The required laser pulse energy;

$$U_L = 3.8 [\text{J}] \left(\frac{13.5 \text{ nm}}{\lambda_X}\right)^{3/4}$$

The important Free-Electron Laser parameters are all given as a function of FEL wavelength $\lambda_X$:

(1) The Pierce parameter;

$$\rho_{FEL} = 1.597 [\%] \left(\frac{\lambda_X}{13.5 \text{ nm}}\right)^{1/2}$$

(2) The longitudinal velocity spread; $\Lambda \approx 1$ for setting $\sigma_\gamma/\gamma \approx \rho_{FEL}$ (3) The e-folding gain length;

$$L_{gain} = 86 [\text{mm}] \left(\frac{13.5 \text{ nm}}{\lambda_X}\right)^{1/2}$$

(4) The saturated power; $P_{sat} = 317$ [GW]
(5) The input power; $P_{in} \approx 5.3$ [MW]

(6) The saturation length;

$$L_{sat} = 1016 [\text{mm}] \left(\frac{13.5 \text{ nm}}{\lambda_X}\right)^{1/2}$$

(7) The total number of periods;

$$N_u = L_{sat}/\lambda_u = 68 \left(\frac{13.5 \text{ nm}}{\lambda_X}\right)^{1/2}$$

(8) The spectral bandwidth; $\Delta\lambda_X/\lambda_X$ $1/N_u \approx 1.5[\%]$
(9) The r.m.s. radiation cone angle;

$$\theta_{rms} = \frac{1}{2\gamma}\left(\frac{1+K_u^2/2}{N_u}\right)^{1/2} = 82[\mu\text{rad}]\left(\frac{\lambda_X}{13.5 \text{ nm}}\right)^{1/4}$$

(10) The average power at the repetition frequency $f_{rep}$ [MHz];

$P_{av} P_{sat} \tau_X f_{rep} = 3.17$ [kW]$f_{rep}$ for the radiation duration $\tau_X \approx \tau_b \sim 10$ fs.

(11) The repetition rate $f_{rep}$ to be required for generating the average Extreme UltraViolet power of $P_{EUV} = 1$ kW;

$f_{rep} \approx P_{EUV}/(P_{sat}\tau_X) = 0.315$ [MHz]

(12) The average fiber laser power for the production of 1 kW Extreme UltraViolet radiation;

$$P_{Lav} \approx U_L f_{rep} = 1.19 [\text{MW}] \left(\frac{13.5 \text{ nm}}{\lambda_X}\right)^{3/4}$$

(13) The average electron beam power;

$$P_{bav} = Q_b f_{rep} E_b = 104 [\text{kW}] \left(\frac{13.5 \text{ nm}}{\lambda_X}\right)^{1/2}$$

(14) The efficiency of the electron beam acceleration;

$$\eta_{laser \rightarrow beam} = P_{bav}/P_{Lav} = 8.7[\%]\left(\frac{\lambda_X}{13.5 \text{ nm}}\right)^{1/4}$$

(15) The efficiency of the production of Extreme UltraViolet radiation;

$$\eta_{laser \rightarrow EUV} = P_{EUV}/P_{Lav} = 0.084[\%]\left(\frac{\lambda_X}{13.5 \text{ nm}}\right)^{3/4}$$

For undulator period $\lambda_u = 15$ mm, the average Extreme UltraViolet power of $P_{EUV} = 1$ kW, the electron beam energy $E_b$, the operating plasma density $n_e$, the accelerator length $L_{acc}$, the required laser peak power $P_L$, the required laser pulse energy $U_L$, the Pierce parameter $\rho_{FEL}$, the saturation length $L_{sat}$, the average fiber laser power $P_{Lav}$ and the efficiency of the production of Extreme UltraViolet radiation $\eta_{eff}$ are shown as a function of the radiation wavelength $\lambda_X$ for the range from 5 nm to 15 nm in FIG. 14, obtained for a given peak magnetic field and a given undulator period, which have been previously set (e.g. $B_u$=1.425 T and $\lambda_u$=15 mm.)

Other examples have been given respectively in table 1 and 2 of section 6.4 for other cases A, B, D, E, F related to other examples of ondulator period with $B_u$=1.425 T).

An exemplary embodiment of the present disclosure provides a new embodiment of a Free Electron Laser, which is more compact and efficient, cheaper and has a higher repetition rate and a higher average power than the prior art Free Electron Lasers.

An exemplary embodiment provides an efficient Free-Electron Laser-based Extreme UltraViolet light source, usable for industrial lithography technology.

CITATION LIST

Patent Literature
(1) U.S. patent application Ser. No. 13/445,195, filed on Apr. 12, 2012, entitled LASER PRODUCED PLASMA EUV LIGHT SOURCE, Pub. No. US 2012/0228526 A1.
(2) U.S. Pat. No. 4,761,584, Date of patent Aug. 2, 1988, entitled STRONG PERMANENT MAGNET-ASSISTED ELECTROMAGNETIC UNDULATOR.
(3) U.S. Pat. No. 5,019,863, Date of patent May 28, 1991, entitled WEDGED-POLE HYBRID UNDULATOR.
(4) International patent application No. PCT/US2012/050135, filed on 9 Aug. 2012, Pub. No. WO/2013/023053, Pub. Date, 14 Feb. 2013, ENTITLED COMPACT UNDULATOR SYSTEM AND METHODS.

Non Patent Literature
(1) A. Pak, K. A. Marsh, S. F. Martins, W. Lu, W. B. Mori, and C. Joshi, "Injection and Trapping of Tunnel-Ionized Electrons into Laser-Produced Wakes," Phys. Rev. Lett. 104, 025003 (2010).
(2) C. McGuffey, A. G. R. Thomas, W. Schumaker, T. Matsuoka, V. Chvykov, F. J. Dollar, G. Kalintchenko, V. Yanovsky, A. Maksimchuk, K. Krushelnick, V. Y. Bychenkov, I. V. Glazyrin, and A. V. Karpeev, "Ionization Induced Trapping in a Laser Wakefield Accelerator," Phys. Rev. Lett. 104, 025004 (2010).
(3) C. Xia, J. Liu, W. Wang, H. Lu, W. Cheng, A. Deng, W. Li, H. Zhang, X. Liang, Y. Leng, X. Lu, C. Wang, J. Wang, K. Nakajima, R. Li, and Z. Xu, "Effects of self-focusing on tunnel-ionization-induced injection in a laser wakefield accelerator," Phys. Plasmas 18, 113101 (2011).
(4) J. S. Liu, C. Q. Xia, W. T. Wang, H. Y. Lu, C. Wang, A. H. Deng, W. T. Li, H. Zhang, X. Y. Liang, Y. X. Leng, X. M. Lu, C. Wang, J. Z. Wang, K. Nakajima, R. X. Li, and Z. Z. Xu, "All-Optical Cascaded Laser Wakefield Accelerator Using Ionization-Induced Injection," Phys. Rev. Lett. 107, 035001 (2011).
(5) B. B. Pollock, C. E. Clayton, J. E. Ralph, F. Albert, A. Davidson, L. Divol, C. Filip, S. H. Glenzer, K. Herpoldt, W. Lu, K. A. Marsh, J. Meinecke, W. B. Mori, A. Pak, T. C. Rensink, J. S. Ross, J. Shaw, G. R. Tynan, C. Joshi, and D. H. Froula, "Demonstration of a Narrow Energy Spread, similar to 0.5 GeV Electron Beam from a Two-Stage Laser Wakefield Accelerator," Phys. Rev. Lett. 107, 045001 (2011).
(6) M. Chen, E. Esarey, C. B. Schroeder, C. G. R. Geddes, and W. P. Leemans, "Theory of ionization-induced trapping in laser-plasma accelerators," Phys. Plasmas 19, 033101 (2012).
(7) Kazuhisa Nakajima, Haiyang Lu, Xueyan Zhao, Baifei Shen, Ruxin Li and Zhizhan Xu, "100-GeV large scale laser plasma electron acceleration by a multi-PW laser" Chinese Optics Letters 11 (1), 013501-1~15 (2013).
(8) J. K. Lim, P. Frigola, G. Travish, J. B. Rosenzweig, S. G. Anderson, W. J. Brown, J. S. Jacob, C. L. Robbins, and A. M. Tremaine, "Adjustable, short focal length permanent-magnet quadrupole based electron beam final focus system", PHYSICAL REVIEW SPECIAL TOPICS—ACCELERATORS AND BEAMS 8, 072401-1~17 (2005).
(9) P. Elleaume, J. Chavanne, Bart Faatz, "Design Considerations for a 1 angstrom SASE Undulator", Nuclear Instruments and Methods in Physics Research A 455, 503-523 (2000).
(10) T. Eichner, F. Grilner, S. Becker, M. Fuchs, D. Habs, R. Weingartner, U. Schramm, H. Backe, P. Kunz, and W. Lauth, "Miniature magnetic devices for laser-based, table-top free-electron lasers", PHYSICAL REVIEW SPECIAL TOPICS—ACCELERATORS AND BEAMS 10, 082401 (2007).
(11) C. Pagani, E. L. Saldin, E. A. Schneidmiller, M. V. Yurkov, "Design considerations of 10 kW-scale extreme ultraviolet SASE FEL for lithography", Nuclear Instruments and Methods in Physics Research A 463, 9-25 (2001).

Although the present disclosure has been described with reference to one or more examples, workers skilled in the art will recognize that changes may be made in form and detail without departing from the scope of the disclosure and/or the appended claims.

The invention claimed is:

1. A Free Electron Laser source generating an electromagnetic beam presenting a wavelength, called Free Electron Laser wavelength $\lambda_X$, belonging to the range from 5 nm to 15 nm, said Free Electron Laser comprising:
   a fiber-based laser, comprising a plurality of amplifying fibres wherein an initial laser pulse is distributed and amplified, and means for grouping together elementary pulses amplified in said fibre in order to form a single amplified global laser pulse, and comprising a stretching device able to stretch out in time said initial laser pulse, according to a chirped pulse amplification technique and a grating pulse compressor able to compress in time said single amplified global laser pulse, according to the chirped pulse amplification technique,
   at least one parameter of said fiber-based laser, called a fiber-based laser parameter, being obtained as a function of said Free Electron Laser wavelength $\lambda_X$;
   a laser plasma accelerator wherein, in a bubble regime of said plasma accelerator said global laser pulse generates electron beams,
   at least one parameter of said laser plasma accelerator, called a laser plasma accelerator parameter, being obtained as a function of said Free Electron Laser wavelength $\lambda_X$;
   a beam focusing system transporting said electron beams from the laser plasma accelerator to an undulator,
   said undulator, wherein said electron beams generate said electromagnetic beam, a peak magnetic field and a period of said undulator being previously set,
   at least one parameter of said undulator, called an undulator parameter, being obtained as a function of said Free Electron Laser wavelength $\lambda_X$; and
   a beam separator system, wherein said electron beams and said electromagnetic beam are separated.

2. A Free Electron Laser source according to claim 1 wherein said laser plasma accelerator comprises:
   a first gas cell filled with mixed gas, and
   a second gas cell filled with pure helium gas,
   a gas feeding system.

3. A Free Electron Laser source according to claim 2 wherein said laser plasma accelerator comprise means for modifying a length of said second gas cell.

4. A Free Electron Laser source according to claim 1 wherein said beam separator system comprises a dipole magnet for bending electron beams and a beam dump.

5. A Free Electron Laser source according to claim 1 wherein said electromagnetic beam is a Extreme UltraViolet beam.

6. A Free Electron Laser source according to claim 5 wherein said Extreme UltraViolet beam wavelength is 13.5 nm.

7. A Free Electron Laser source according to claim 1 wherein said beam wavelength is 6.7 nm.

* * * * *